United States Patent
Tamilselvam et al.

(10) Patent No.: US 12,217,031 B2
(45) Date of Patent: Feb. 4, 2025

(54) MONOLITH-TO-MICROSERVICE REFACTORING VIA SOURCE-CODE-TO-DOMAIN-MODEL GRAPH COMPARISON

(71) Applicant: International Business Machines Corporation, Armonk, NY (US)

(72) Inventors: Srikanth Govindaraj Tamilselvam, Ayapakkam (IN); Amith Singhee, Karnataka (IN); Divakar R. Mysore, Bangalore (IN); Radhika Vaddarse, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 17/815,430

(22) Filed: Jul. 27, 2022

(65) Prior Publication Data
US 2024/0036837 A1    Feb. 1, 2024

(51) Int. Cl.
G06F 8/41    (2018.01)
G06F 8/72    (2018.01)

(52) U.S. Cl.
CPC .............. *G06F 8/427* (2013.01); *G06F 8/447* (2013.01); *G06F 8/72* (2013.01)

(58) Field of Classification Search
CPC .............. G06F 8/427; G06F 8/447; G06F 8/72
See application file for complete search history.

(56) References Cited

U.S. PATENT DOCUMENTS

| | | |
|---|---|---|
| 10,230,571 B2 | 3/2019 | Rangasamy et al. |
| 10,637,952 B1 | 4/2020 | Koenig et al. |
| 10,985,997 B2 | 4/2021 | Duggal et al. |
| 11,030,281 B2 | 6/2021 | Duggal et al. |
| 11,327,750 B1 | 5/2022 | Chawda et al. |
| 11,354,120 B1* | 6/2022 | Zhang ........................ G06F 8/72 |
| 11,467,826 B1* | 10/2022 | Chawda .................. G06F 9/547 |
| 11,500,628 B1* | 11/2022 | Chawda ................... G06F 8/77 |

(Continued)

FOREIGN PATENT DOCUMENTS

| | | |
|---|---|---|
| CN | 112346717 A | 2/2021 |
| DE | 112017006994 T5 | 10/2019 |

OTHER PUBLICATIONS

Gysel et al., "Service Cutter: A Systematic Approach to Service Decomposition", published by 5th European Conference on Service-Oriented and Cloud Computing (ESOCC), Sep. 2016, Vienna, Austria., pp. 0-15 (Year: 2017).*

(Continued)

*Primary Examiner* — Anibal Rivera
*Assistant Examiner* — Zheng Wei
(74) *Attorney, Agent, or Firm* — Amin, Turocy & Watson, LLP

(57) ABSTRACT

Systems/techniques that facilitate monolith-to-microservice refactoring via source-code-to-domain-model graph comparison are provided. In various embodiments, a system can access source code of a monolithic application and a target domain model corresponding to the monolithic application. In various aspects, the system can refactor the monolithic application into microservices, by aligning a first graph representing the source code with a second graph representing the target domain model.

20 Claims, 25 Drawing Sheets

(56) References Cited

U.S. PATENT DOCUMENTS

| | | | |
|---|---|---|---|
| 11,762,639 | B2* | 9/2023 | Jaeger .................. G06F 9/5055 717/143 |
| 2019/0108067 | A1 | 4/2019 | Ishikawa et al. |
| 2020/0067800 | A1* | 2/2020 | Wang ...................... H04L 67/51 |
| 2021/0124576 | A1* | 4/2021 | Gungabeesoon ......... G06F 8/38 |
| 2021/0232390 | A1 | 7/2021 | Iwang et al. |
| 2022/0060431 | A1* | 2/2022 | Vadayadiyil Raveendran ............ H04L 41/147 |
| 2022/0107785 | A1 | 4/2022 | Vadayadiyil Raveendran et al. |
| 2023/0176838 | A1* | 6/2023 | Bronevetsky ............. G06F 8/71 717/110 |

OTHER PUBLICATIONS

Zhou et al., English transaction of foreign patent document CN112346717 cited in IDS filed Jul. 14, 2023, pp. 1-11 (Year: 2021).*

Tyszberowicz et al., "Identifying Microservices using Functional Decomposition", published by Springer Nature Switzerland, AG 2018, pp. 50-65 (Year: 2018).*

Sarita et al., "Transform Monolith into Microservices using Docker" published by 2017 International Conference on Computing, Communication, Control and Automation (ICCUBEA), pp. 1-5 (Year: 2017).*

International Search Report and Written Opinion received for PCT Application Serial No. PCT/CN2023/095037 dated Jun. 21, 2023, 7 pages.

Kriege et al., Subgraph Matching Kernels for Attributed Graphs, https://arxiv.org/pdf/1206.6483.pdf, 2012, 8 pgs.

Heimann et al., REGAL: Representation Learning-based Graph Alignment, arXiv: 1802.06257v3 [cs.SI], Aug. 25, 2018, 10 pgs.

Li et al., Graph Matching Networks for Learning the Similarity of Graph Structured Objects, arXiv: 1904.12787v2 [cs.LG], May 12, 2019, 18 pgs.

Sinha et al., Evaluation of Siamese Networks for Semantic Code Search, arXiv:2011.01043v1 [cs.SE], Oct. 12, 2020, 9 pgs.

Baresi et al., Microservices Identification Through Interface Analysis, (Eds.): ESOCC 2017, LNCS 10465, pp. 19-33, Sep. 1, 2017, 15 pgs.

Bonham et al., Decomposing the Monolith with Event Storming, https://medium.com/capital-one-tech/event-storming-decomposing-the-monolith-to-kick-start-your-microservice-architecture-acb8695a6e61, Nov. 18, 2019, 11 pgs.

Rossi et al., A Structural Graph Representation Learning Framework, http://ryanrossi.com/pubs/WSDM20-structural-hode-embedding-framework.pdf, Feb. 3-7, 2020, 9 pgs.

Liu, G-Finder: Approximate Attributed Subgraph Matching, https://par.nsf.gov/servlets/purl/10159289, Dec. 9-12, 2019, 10 pgs.

Leskovec, Neural Subgraph Matching, http://snap.stanford.edu/subgraph-matching/, SNAP, last accessed Jun. 24, 2022, 2 pgs.

Hippchen et al., Designing Microservice-Based Applications by Using a Domain-Driven Design Approach, Research Group Cooperation & Management (C&M) Karlsruhe Institute of Technology (KIT) Zirkel 2, 76131 Karlsruhe, Germany, Dec. 2017, 15 pgs.

Merson et al., Modeling Microservices with DDD, 2020 IEEE International Conference on Software Architecture Companion (ICSA-C), 2020, 2 pgs.

Gu, A Meta-Approach to Guide Architectural Refactoring from Monolithic Applications to Microservices, Institute of Software Technology, Dec. 3, 2020, 94 pgs.

Hao, Bian Applied to Microservices: Mapping toDomain-Driven Design, BIAN for Microservices using Domain-Driven Design | Medium, Feb. 3, 2021, 8 pgs.

Alsolami, Domain-Driven Microservice Architecture for Designing Modern Applications, IJCSNS International Journal of Computer Science and Network Security, vol. 20 No. 6, Jun. 2020, 8 pgs.

Zaschke, Elaboration of a Domain Model for Migrating the Monolithic Software Architecture of a Data Management Server into a Microservice Architecture, Proceedings of the 11th International Joint Conference on Knowledge Discovery, Knowledge Engineering and Knowledge Management (IC3K 2019), pp. 212-218, Sep. 17, 2019, 7 pgs.

Gomez, From Monolith to Observable Microservices Using DDD, www.infoq.com/presentations/monolith-observable-microservices-ddd/, Aug. 15, 2019, 13 pgs.

Lavann et al., Monoliths to microservices using domain-driven design, https://docs.microsoft.com/en-US/azure/architecture/microservices/migrate-monolith, Azure Architecture Center | Microsoft Docs, Feb. 13, 2021, 8 pgs.

Diepenbrock et al., An Ontology-based Approach for Domain-driven Design of Microservice Architectures, Lecture Notes in Informatics (LNI), Gesellschaft fur Informatik, Bonn 2017, 1777, 15 pgs.

Megargel et al., Migrating from monoliths to cloud-based microservices: A banking industry example, https://ink.library.smu.edu.sg/sis_research, Jan. 2020, 26 pgs.

Banking Industry Architecture Network, BIAN Semantic APIs, https://bian.org/semantic-apis/, last accessed Jul. 27, 2022.

Jin et al., Understanding and Evaluating Structural Node Embeddings, http://www.mlgworkshop.org/2020/papers/ MLG2020_paper_29.pdf, ACM ISBN, Aug. 2020, 8 pgs.

* cited by examiner

MONOLITH-TO-MICROSERVICE REFACTORING VIA SOURCE-CODE-TO-DOMAIN-MODEL GRAPH COMPARISON

BACKGROUND

The subject disclosure relates to microservice refactoring, and more specifically to monolith-to-microservice refactoring via source-code-to-domain-model graph comparison.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate monolith-to-microservice refactoring via source-code-to-domain-model graph comparison are described.

According to one or more embodiments, a system is provided. The system can comprise a non-transitory memory that can store computer-executable components. The system can further comprise a processor that can be operably coupled to the memory and that can execute the computer-executable components stored in the memory. In various embodiments, the computer-executable components can comprise an access component that can access source code of a monolithic application and a target domain model corresponding to the monolithic application. In various aspects, the computer-executable components can further comprise a mapping component that can refactor the monolithic application into microservices, by aligning a first graph representing the source code with a second graph representing the target domain model.

According to one or more embodiments, the above-described system can be implemented as a computer-implemented method and/or as a computer program product.

DETAILED DESCRIPTION

Figure 1:
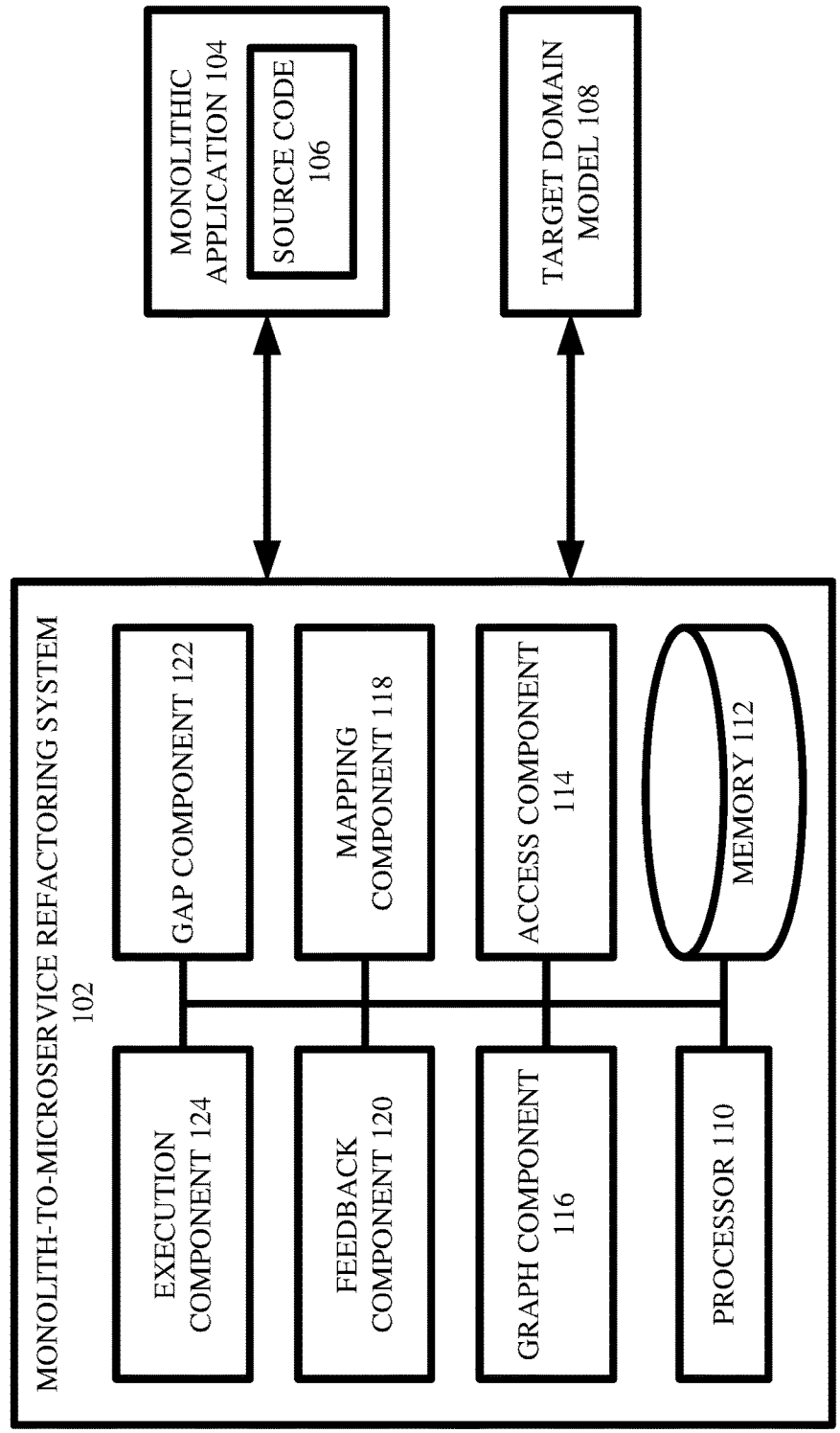
FIG. 1 illustrates a block diagram of an example, non-limiting system that facilitates monolith-to-microservice refactoring via source-code-to-domain-model graph comparison in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A monolithic application can be a self-contained set of computer programs, with each computer program being a sequence of computer-executable instructions, that can be independent from (e.g., that can refrain from calling/invoking) other computing applications. That is, a monolithic application can perform/facilitate an overarching functionality/task, where that overarching functionality/task can be made up of many different sub-functionalities/sub-tasks, and where a codebase of the monolithic application can contain all (or substantially all) the computer-executable instructions for performing/facilitating such many different sub-functionalities/sub-tasks. Monolithic applications can generally be too big and/or cumbersome to fit into a cloud-native environment, and they can often fail to exhibit the benefits that cloud-native applications offer (e.g., scalability, continuous deployment, stateless deployment, agility, ease of troubleshooting).

In contrast to a monolithic application, a microservice can be an independently-developable and/or independently-deployable sub-application that can be dependent upon (e.g., that can call/invoke) other microservices and/or other computing applications. That is, a microservice can be a codebase that performs/facilitates at most one or an otherwise small number of specific sub-functionalities/sub-tasks. In various instances, a microservice can be cloud-based. In various cases, multiple microservices can be loosely coupled together (e.g., via service-exposing method calls) to form a total and/or overarching computing application.

In various aspects, it can be beneficial to modernize a monolithic application by refactoring the monolithic application into microservices. As those having ordinary skill in the art will appreciate, refactoring the monolithic application into microservices can involve identifying which specific portions of the source code of the monolithic application perform the same sub-functionalities/sub-tasks as various microservices, such that those specific portions of the source code can be replaced and/or substituted (e.g., incrementally and/or all at once) by those various microservices.

Some techniques for refactoring a monolithic application into microservices can work in bottom-up fashion. In particular, such bottom-up techniques can detect functional boundaries within the source code of the monolithic application, where the detected bounded portions of the source code can be treated as potential candidates for microservice replacement/substitution. Unfortunately, and as the inventors of various embodiments described herein recognized, such bottom-up techniques can fail to consider external information regarding what microservices are available and/or what sub-functionalities/sub-tasks those microservices perform. Because of such failure to consider external information regarding microservices, such bottom-up techniques can often yield inaccurate, imprecise, and/or otherwise unhelpful refactoring results (e.g., such bottom-up techniques can suffer from granularity mismatches, sub-functionality/sub-task mismatches, and/or vocabulary mismatches between the detected bounded portions of the source code and available microservices, since external information about the available microservices is not considered).

Other techniques for refactoring a monolithic application into microservices can work in top-down fashion. In particular, such top-down techniques (e.g., domain-driven design, event storming) can involve obtaining/constructing a target domain model (e.g., a banking industry architecture network (BIAN) model, an enhanced telecommunications operations map (eTOM) model). In various cases, the target domain model can be a standardized and/or non-standardized document that defines capabilities, and thus microservices, that are expected to be satisfied by the monolithic application. In various aspects, such top-down techniques can further include having subject matter experts determine which portions of the source code of the monolithic application correspond to which microservices indicated by the target domain model. Such top-down techniques' use of target domain models as external reference information can help to ameliorate some shortcomings of the above-mentioned bottom-up techniques. However, such top-down techniques can be wholly manual processes that consume many months' worth of man-hours.

Accordingly, systems and/or techniques that can address one or more of these technical problems can be desirable.

Various embodiments described herein can ameliorate one or more of such technical problems. More specifically, various embodiments described herein can include systems, computer-implemented methods, apparatus, and/or computer program products that can facilitate monolith-to-microservice refactoring via source-code-to-domain-model graph comparison. In other words, the present inventors devised a computer-implemented technique for automatically refactoring a monolithic application into microservices, which computer-implemented technique can involve application of graph theory comparison metrics between the source code of the monolithic application and a target domain model corresponding to the monolithic application. Because such computer-implemented technique can leverage a target domain model, such computer-implemented technique can avoid the pitfalls that plague the above-mentioned bottom-up techniques. Furthermore, because such computer-implemented technique can automate the process of monolith-to-microservice refactoring through application of graph theory comparison metrics, such computer-implemented technique can consume many orders of magnitude less time than the above-mentioned top-down techniques (e.g., such top-down techniques can consume months' worth of time, whereas the herein-described computer-implemented technique can consume mere minutes' worth of time).

Various embodiments described herein can be considered as a computerized tool (e.g., any suitable combination of computer-executable hardware and/or computer-executable software) that can facilitate monolith-to-microservice refactoring via source-code-to-domain-model graph comparison. In various aspects, such computerized tool can include an access component, a graph component, a mapping component, a feedback component, a gap component, and/or an execution component.

In various embodiments, there can be any suitable monolithic application. In various aspects, the monolithic application can be implemented by source code, which can be written in any suitable coding language and/or with any suitable coding syntax. In various instances, the source code of the monolithic application can be one or more scripts that define any suitable number of programs. In various cases, each program written within the source code can be any suitable sequence of computer-executable instructions. In some aspects, a program written within the source code can perform any suitable number of non-exposing method calls on any suitable number of data objects. Furthermore, in some instances, a program written within the source code can perform any suitable number of program-exposing method calls. As those having ordinary skill in the art will appreciate, a data object can be one or more scalars, one or more vectors, one or more matrices, one or more tensors, one or more character strings, and/or any suitable combination thereof. As those having ordinary skill in the art will further appreciate, a non-exposing method call can be any suitable electronic function, operation, transformation, and/or manipulation that can be performed on a data object and that can be considered as self-contained within a single program of the source code (e.g., a non-exposing method call can refrain from interacting with other programs written in the source code). In contrast, and as those having ordinary skill in the art will also appreciate, a program-exposing method call can be an electronic invocation, activation, and/or initiation of another program that is written within the source code.

As a non-limiting example, suppose that the source code includes a program A and a program B. In various cases, the program A can access an input vector (e.g., a data object) and can perform a function (e.g., a non-exposing method call) on that input vector, thereby yielding a transformed vector (e.g., another data object). Furthermore, in various instances, the program A can invoke (e.g., can expose) the program B, such that the program B can then operate on and/or otherwise utilize (e.g., can perform another non-exposing method call on) the transformed vector.

In various embodiments, the monolithic application can be associated with a target domain model. As those having ordinary skill in the art will appreciate, the target domain model can be any suitable electronic natural language document, whether standardized and/or non-standardized, that specifies, describes, defines and/or otherwise indicates capabilities that are desired, expected, and/or aspired to be fulfilled by the monolithic application. In other words, the target domain model can be considered as a reference taxonomy/hierarchy of business logic to which the monolithic application is desired/expected to conform. For instance, the target domain model can specify any suitable number of service domains which the monolithic application is desired/expected to implement, where a service domain can be a description/specification of a discrete, cohesive cluster of business logic that is deemed responsible for performing/facilitating any suitable number of business capabilities on any suitable number of business objects. As those having ordinary skill in the art will appreciate, a business object can be a description/specification of any suitable piece of electronic information/data, and a business capability can be a description/specification of any suitable function, operation, transformation, and/or manipulation that can be performed/facilitated on a business object. Furthermore, the target domain model can, in various aspects, describe/specify any suitable number of interactions that can be desired/expected to occur between different service domains. As some non-limiting examples, the target domain model can be a BIAN specification or an eTOM specification.

In any case, each service domain that is specified in the target domain model can be known and/or deemed to correspond to at least one microservice. That is, for any given service domain in the target domain model, the target domain model can specify which business capabilities are supposed to be performed, facilitated, and/or otherwise provided by that given service domain, and there can be at least one known microservice that can perform, facilitate, and/or otherwise provide those specified business capabilities.

In various embodiments, it can be desired to refactor the monolithic application into microservices. As described herein, the computerized tool can automatically facilitate such refactoring, by leveraging both the source code of the monolithic application and the target domain model.

In various embodiments, the access component of the computerized tool can electronically receive and/or otherwise access the source code and/or the target domain model. In some aspects, the access component can retrieve the source code and/or the target domain model from any suitable centralized and/or decentralized data structures (e.g., graph data structures, relational data structures, hybrid data structures), whether remote from and/or local to the access component. In other aspects, the access component can retrieve the source code and/or the target domain model from any other suitable computing devices. In any case, the access component can electronically obtain and/or access the source code and/or the target domain model, such that other components of the computerized tool can electronically interact with (e.g., read, write, edit, copy, manipulate) the source code and/or the target domain model.

In various embodiments, the graph component of the computerized tool can electronically generate a graph (e.g., a data structure having nodes/vertices and edges) based on the source code. More specifically, in various aspects, the graph component can electronically parse, via any suitable static and/or dynamic (e.g., runtime-based) parsing techniques, the source code of the monolithic application. Via such parsing, the graph component can identify and/or otherwise detect the programs that are written within the source code. Furthermore, via such parsing, the graph component can identify and/or otherwise detect the program-exposing method calls that are written within the source code. In particular, for any given program-exposing method call that is written within the source code, the graph component can discover, via such parsing, which program of the source code is configured to make that given program-exposing method call and which program of the source code is configured to be invoked by that given program-exposing method call. Accordingly, in various instances, the graph component can construct and/or otherwise generate a graph, such that the nodes/vertices of the graph respectively represent the identified/detected programs (e.g., the graph component can generate one new node/vertex per program), and/or such that the edges of the graph respectively represent the identified/detected program-exposing method calls (e.g., the graph component can generate one new edge per program-exposing method call). In various cases, such graph can be referred to as a code graph, since it can be created based on the source code.

In some cases, the code graph can be unweighted. In other cases, the code graph can be weighted according to any suitable attributes/properties of the programs written in the source code. For instance, for any given node in the code graph, the given node can represent a given program, and the attributes of the given node can include: entrypoint association with other nodes (e.g., an entrypoint association attribute can indicate whether or not the given program appears in an execution trace of another specific program); common entrypoints with other nodes (e.g., a common entrypoint attribute can indicate whether or not the given program and another specific program have the same entrypoint as each other); inheritance (e.g., an inheritance attribute can indicate whether or not a data object manipulated by the given program inherits one or more of its properties from a data object of another specific program and/or bequeaths one or more of its properties to a data object of another specific program); and/or data object association (e.g., a data object association attribute can indicate whether or not the given program and another specific program operate on a same data object as each other).

As a non-limiting example, suppose that the source code includes a program X, a program Y, and a program Z. Moreover, suppose that the program X includes a first program-exposing method call to the program Y and a second program-exposing method call to the program Z. Furthermore, suppose that the program Z includes a third program-exposing method call to the program Y. In such case, the graph component can parse the source code, thereby identifying/detecting the program X, the program Y, the program Z, the first program-exposing method call, the second program-exposing method call, and the third program-exposing method call. In various aspects, the graph component can create a graph based on such parsing. In particular, the graph can include: a node X that represents the program X; a node Y that represents the program Y; and a node Z that represents the program Z. Moreover, because the first program-exposing method call can be made from the program X and to the program Y, the graph can include a first directed edge between the node X and the node Y, where the first directed edge can point away from the node X and toward to the node Y. Likewise, because the second program-exposing method call can be made from the program X and to the program Z, the graph can include a second directed edge between the node X and the node Z, where the second directed edge can point away from the node X and toward to the node Z. Similarly, because the third program-exposing method call can be made from the program Z and to the program Y, the graph can include a third directed edge between the node Z and the node Y, where the third directed edge can point away from the node Z and toward to the node Y. In this way, the graph component can generate a graph, based on the programs and/or program-exposing method calls identified/detected by parsing through the source code. As mentioned above, such graph can be referred to as a code graph.

Furthermore, as mentioned above, the graph component can, in various aspects, parse the source code dynamically (e.g., during runtime of the source code), so as to generate different execution traces and/or production logs of the source code. In various instances, such different execution traces and/or production logs can indicate different sequences of program-to-program interactions that are implementable by the source code (e.g., can indicate different execution orders and/or different execution branches which the source code can exhibit in different contexts). In some cases, such different sequences of program-to-program interactions can be referred to as different program transactions. In any case, edge weights of the code graph can be based on such different sequences of program-to-program interactions. For example, there can be many different program-exposing method calls written within the source code, but some of the many different program-exposing method calls can be implemented/executed more frequently than others. In particular, a first subset of the many different program-exposing method calls can be involved and/or otherwise present in a larger proportion of the different sequences of program-to-program interactions. Accordingly, edges in the code graph that respectively represent the first subset of the many different program-exposing method calls can be assigned larger and/or more important weight values. In contrast, a second subset of the many different program-exposing method calls can be implemented/executed less frequently. That is, the second subset of the many different program-exposing method calls can be involved and/or otherwise present in a smaller proportion of the different sequences of program-to-program interactions (e.g., it can even be possible for a program-exposing method call to not be present in any sequence of program-to-program interactions, in which case such program-exposing method call be considered as unused notwithstanding being present in the source code). Accordingly, edges in the code graph that respectively represent the second subset of the many different program-exposing method calls can be assigned smaller and/or less important weight values.

Just as above, in various embodiments, the graph component of the computerized tool can electronically generate another graph based on the target domain model. More specifically, in various aspects, the graph component can electronically parse, via any suitable textual parsing techniques, the target domain model. Via such parsing, the graph component can identify and/or otherwise detect the service domains that are specified within the target domain model (e.g., within a swagger portion of the target domain model). Furthermore, via such parsing, the graph component can identify and/or otherwise detect the service domain interactions that are specified within the target domain model (e.g., within a transaction/process flow portion of the target domain model). In particular, for any given service domain interaction that is specified within the target domain model, the graph component can discover, via such parsing, which service domain is desired/expected to initiate that given interaction and which service domain is desired/expected to be invoked by that given interaction. Accordingly, in various instances, the graph component can construct and/or otherwise generate a graph, such that the nodes/vertices of the graph respectively represent the identified/detected service domains (e.g., the graph component can generate one new node/vertex per service domain), and/or such that the edges of the graph respectively represent the identified/detected service domain interactions (e.g., the graph component can generate one new edge per service domain interaction). In various cases, such graph can be referred to as a model graph, since it can be created based on the target domain model.

In some cases, the model graph can be unweighted. In other cases, the model graph can be weighted according to any suitable attributes/properties of the service domains specified in the target domain model. For instance, and similar to as described above, for any given node in the model graph, the given node can represent a given service domain, and the attributes of the given node can include: entrypoint association with other nodes (e.g., an entrypoint association attribute can indicate whether or not the given service domain appears in an interaction trace of another specific service domain); common entrypoints with other nodes (e.g., a common entrypoint attribute can indicate whether or not the given service domain and another specific service domain have the same interaction entrypoint as each other); inheritance (e.g., an inheritance attribute can indicate whether or not a business object manipulated by the given service domain inherits one or more of its properties from a business object of another specific service domain and/or bequeaths one or more of its properties to a business object of another specific service domain); and/or business object association (e.g., a business object association attribute can indicate whether or not the given service domain and another specific service domain manipulate a same business object as each other).

As a non-limiting example, suppose that the target domain model specifies a service domain H, a service domain I, and a service domain J. Moreover, suppose that the target domain model specifies a first interaction from the service domain H to the service domain J and a second interaction from the service domain I to the service domain J. In such case, the graph component can parse the target domain model, thereby identifying/detecting the service domain H, the service domain I, the service domain J, the first interaction, and the second interaction. In various aspects, the graph component can create a graph based on such parsing.

In particular, the graph can include: a node H that represents the program H; a node I that represents the program I; and a node J that represents the program J. Moreover, because the first interaction can be made from the service domain H and to the service domain J, the graph can include a first directed edge between the node H and the node J, where the first directed edge can point away from the node H and toward to the node J. Likewise, because the second interaction can be made from the service domain I and to the service domain J, the graph can include a second directed edge between the node I and the node J, where the second directed edge can point away from the node I and toward to the node J. In this way, the graph component can generate a graph, based on the service domains and/or the service domain interactions identified/detected by parsing through the target domain model. As mentioned above, such graph can be referred to as a model graph.

In various embodiments, the mapping component of the computerized tool can electronically refactor the monolithic application into microservices, based on both the code graph and the model graph. More specifically, in various aspects, the mapping component can electronically align nodes of the code graph with nodes of the model graph, thereby yielding a set of node pairs. In other words, the mapping component can map and/or otherwise correlate (e.g., not necessarily in one-to-one fashion) nodes of the model graph to corresponding nodes of the code graph. Since nodes of the model graph can represent respective service domains specified by the target domain model, and since nodes of the code graph can represent respective programs written in the source code of the monolithic application, the set of node pairs can be considered as indicating which programs of the monolithic application embody (e.g., are most similar to) which service domains of the target domain model. Moreover, because each service domain can already be known/deemed to correspond to at least one microservice, the set of node pairs can thus be considered as indicating which programs of the monolithic application can be replaced/substituted by which known microservices. Further non-limiting details regarding how the mapping component can generate the set of node pairs follow.

In various aspects, the mapping component can electronically store, maintain, control, and/or otherwise access a graph convolutional neural network. In various instances, the graph convolutional neural network can exhibit any suitable architecture. For example, the graph convolutional neural network can include any suitable number of layers (e.g., an input layer, one or more hidden layers, an output layer), any suitable types of layers (e.g., pooling payers, batch normalization layers, convolutional layers with any suitable convolutional kernels/filters), any suitable numbers of neurons in various layers (e.g., different layers can have the same and/or different numbers of neurons as each other), any suitable activation functions (e.g., sigmoid, softmax, hyperbolic tangent, rectified linear unit) in various neurons (e.g., different neurons can have the same and/or different activation functions as each other), and/or any suitable interneuron connections (e.g., forward connections, skip connections, recurrent connections).

In any case, the graph convolutional neural network can be configured to receive as input a graph and to produce as output embedded representations of the nodes of that inputted graph. In other words, for each given node of the inputted graph, the graph convolutional neural network can generate/output a continuous vector having any suitable dimensionality, where that continuous vector can represent the given node. That is, the values/magnitudes of the elements of that continuous vector can depend upon the attributes and/or edge connectivity (e.g., neighborhood) of that given node. As those having ordinary skill in the art will appreciate, the graph convolutional neural network can have undergone any suitable type and/or style of training so as to learn how to accurately generate embedded node-wise representations of inputted graphs. Non-limiting examples of such training can include supervised training, unsupervised training, and/or reinforcement learning. As those having ordinary skill in the art will further appreciate, any suitable training termination criteria, any suitable training objective/loss/error functions, and/or any suitable training batch sizes can be implemented to train the graph convolutional neural network.

Accordingly, in various aspects, the mapping component can execute the graph convolutional neural network on the code graph, which can cause the graph convolutional neural network to produce a set of embedded node-wise representations of the code graph. In particular, the mapping component can feed the code graph to an input layer of the graph convolutional neural network (e.g., each neuron of the input layer can receive a respective node from the code graph), the code graph can complete a forward pass through one or more hidden layers of the graph convolutional neural network, and an output layer of the graph convolutional neural network can compute the set of embedded node-wise representations of the code graph based on activations provided by the one or more hidden layers. In various cases, the set of embedded node-wise representations of the code graph can include one unique continuous vector per unique node of the code graph. As those having ordinary skill in the art will appreciate, the graph convolutional neural network can thus be considered as importing the code graph into an embedding space.

Similarly, in various instances, the mapping component can execute the graph convolutional neural network on the model graph, which can cause the graph convolutional neural network to produce a set of embedded node-wise representations of the model graph. In particular, the mapping component can feed the model graph to the input layer of the graph convolutional neural network (e.g., each neuron of the input layer can receive a respective node from the model graph), the model graph can complete a forward pass through the one or more hidden layers of the graph convolutional neural network, and the output layer of the graph convolutional neural network can compute the set of embedded node-wise representations of the model graph based on activations provided by the one or more hidden layers. Just as above, in various cases, the set of embedded node-wise representations of the model graph can include one unique continuous vector per unique node of the model graph. As those having ordinary skill in the art will appreciate, the graph convolutional neural network can thus be considered as importing the model graph into the same embedding space into which the code graph was imported. Accordingly, in various instances, each embedded node-wise representation of the model graph can be a continuous vector having the same dimensionality (e.g., the same number of elements) as each embedded node-wise representation of the code graph.

Although the herein disclosure mainly describes various embodiments of the mapping component as generating the embedded node-wise representations of the code graph and/or of the model graph via the graph convolutional neural network, this is a mere non-limiting example for ease of explanation. In various aspects, the mapping component can utilize and/or leverage any other suitable embedded representation learning technique to create the embedded node-wise representations of the code graph and/or of the model graph.

In any case, the mapping component can generate the set of node pairs, based on the embedded node-wise representations of the code graph and based on the embedded node-wise representations of the model graph. More specifically, the mapping component can iterate through each node in the model graph. For each given node in the model graph, the mapping component can compare the embedded representation of that given node to the embedded representations of the nodes in the code graph. In various aspects, the mapping component can identify a node from the code graph which has an embedded representation that is nearest and/or closest (e.g., in terms of Euclidean distance) to the embedded representation of the given node, and the mapping component can mark and/or otherwise label that identified node from the code graph as being mapped, linked, correlated, and/or paired to the given node from the model graph.

After all, each node's embedded representation can be based on the edge connectivity (e.g., neighborhood) and/or attributes of that node. Thus, when a first node in the model graph has a similar and/or same embedded representation (e.g., measured by Euclidean distance) as a second node in the code graph, this can indicate that those two nodes have similar/same edge connectivities and/or attributes. Furthermore, when a first node in the model graph has similar/same edge connectivities and/or attributes as a second node in the code graph, this can mean that the specified behavior (e.g., as indicated by the target domain model) of a service domain represented by the first node can closely match the actual behavior (e.g., as indicated by the source code) of a program represented by the second node.

In any case, by performing iterating through each node in the model graph and searching for a node in the code graph that has a nearest/closest embedded representation, the mapping component can map, link, correlate, and/or pair each node in the model graph to a corresponding node in the code graph, thereby yielding the set of node pairs.

As described herein, the mapping component can thus be considered as importing (e.g., via the graph convolutional neural network) both the code graph and the model graph into a common embedding space, and as generating the set of node pairs based on inter-node distances in such common embedding space.

Although the herein disclosure mainly describes various embodiments of the mapping component as generating the set of node pairs based on a common embedding space technique, this is a mere non-limiting example for ease of explanation. In various aspects, the mapping component can generate the set of node pairs by implementing any other suitable graph alignment technique, such as subgraph kernel techniques. That is, no matter which graph alignment technique is used by the mapping component, the result can be the set of node pairs.

In any case, the mapping component can generate the set of node pairs, which can be considered as mapping/linking nodes of the model graph to corresponding nodes of the code graph. Note that, in various aspects, such mapping/linking/pairing can, but need not, be one-to-one. For example, in some instances, there can be one or more nodes in the code graph to which no nodes in the model graph are mapped/linked/paired. As another example, in other instances, there can be a node in the code graph to which more than one node from the model graph are mapped/linked/paired.

In various aspects, as mentioned above, each node in the code graph can represent a respective program written in the source code. Moreover, as mentioned above, each node in the model graph can represent a respective service domain specified in the target domain model. Accordingly, because the set of node pairs can map/link/correlate nodes of the code graph to nodes of the model graph, the set of node pairs can further be considered as mapping/linking/correlating programs written in the source code to service domains specified by the target domain model. Furthermore, because each service domain can be known/deemed to correspond to at least one microservice, the set of node pairs can thus further be considered as mapping/linking/correlating programs written in the source code to known microservices. In other words, the set of node pairs can be considered as indicating how the source code of the monolithic application can be refactored into microservices (e.g., can be considered as conveying which programs written in the source code can be replaced/substituted by which known microservices). Accordingly, the set of node pairs can be considered as the results that are obtained when microservice refactoring is facilitated/performed on the monolithic application.

In various aspects, the mapping component can compute a confidence score for each of the set of node pairs. In various instances, for any given node pair, the confidence score can indicate how similar and/or how dissimilar the two nodes listed in the given node pair are. Indeed, as those having ordinary skill in the art will appreciate, when a first node from the model graph and a second node from the code graph are listed in the set of node pairs as being mapped/linked/correlated to each other, this can mean that, out of all of the nodes in the code graph, the second node is the one that is closest to (e.g., most similar to and/or least dissimilar from) the first node in the model graph. Thus, it can be possible for two nodes to be quite dissimilar from each other, notwithstanding being mapped/linked/correlated to each other in the set of node pairs. In various cases, a confidence score can indicate how similar and/or dissimilar such two node are.

In various aspects, for any given node pair, a confidence score for that node pair can be a real-valued scalar whose value/magnitude can be based on the Euclidean distance separating the embedded representations of that node pair. For example, the confidence score can be inversely proportional to the Euclidean distance between the embedded representations of that node pair, such that the value/magnitude of the confidence score can increase as the Euclidean distance separating the embedded representations decreases.

As another example, for any given node pair, a confidence score for that node pair can be a categorical variable obtained based on a supplemental textual/semantic comparison of the source code with the target domain model. For instance, suppose that a first node from the model graph is listed in the set of node pairs as being mapped/linked/correlated to a second node from the code graph. Furthermore, suppose that the first node represents a particular service domain specified by the target domain model and that the second node represents a particular program written in the source code. In various aspects, the mapping component can parse the target domain model in search of keywords associated with that particular service domain (e.g., keywords used in the definitions/descriptions of business capabilities fulfilled by that particular service domain, keywords used in the definitions/descriptions of service domain interactions participated in by that particular service domain). Furthermore, in various instances, the mapping component can parse the source code in search for programs that are associated with such keywords (e.g., for programs whose method calls and/or coding comments prominently utilize such keywords). If such parsing reveals that no program written within the source code is more strongly associated with such keywords than the particular program (e.g., if the supplemental natural language processing performed by the mapping component agrees that the first node and the second node should be mapped/linked/correlated with each other), the confidence score for the first node and the second node can be set to a "confident" category. In contrast, if such parsing instead reveals that some other program written within the source code is more strongly associated with such keywords than the particular program (e.g., if the supplemental natural language processing performed by the mapping component disagrees that the first node and the second node should be mapped/linked/correlated with each other), the confidence score for the first node and the second node can instead be set to an "unconfident" category.

In any case, the mapping component can generate the set of node pairs (e.g., the refactoring results) by aligning the code graph with the model graph, and the mapping component can, in various instances, generate confidence scores for such set of node pairs.

In various embodiments, the execution component of the computerized tool can electronically transmit an electronic message to any suitable computing device, where the electronic message can indicate one or more of the set of node pairs. That is, the execution component can, in some cases, electronically share, with any suitable computing device, the results that are obtained when microservice refactoring is facilitated/performed on the monolithic application. In various other embodiments, the execution component of the computerized tool can electronically render one or more of the set of node pairs on any suitable computer display, screen, and/or monitor, such that the set of node pairs are visible to a user/technician. That is, the execution component can, in various cases, electronically display the results that are obtained when microservice refactoring is facilitated/performed on the monolithic application.

In various embodiments, the feedback component of the computerized tool can electronically access user-provided feedback regarding the set of node pairs. In particular, in various aspects, the feedback component can electronically transmit a request to any suitable computing device, where such request can indicate one or more of the set of node pairs, and where such request can prompt a user of the computing device to approve and/or reject such one or more of the set of node pairs. In various instances, in response to the request, the feedback component can receive user-provided feedback from the computing device, where such user-provided feedback can approve and/or reject such one or more of the set of node pairs. In some cases, for a node pair that is rejected, the user-provided feedback can indicate a corrected/updated node pair that can replace such rejected node pair, and the feedback component can accordingly rewrite the rejected node pair to become the corrected/updated node pair. In some cases, the feedback component can subject all of the set of node pairs to user review in this fashion (e.g., can prompt the user for feedback regarding each of the set of node pairs). In other cases, the feedback component can subject fewer than all of the set of node pairs to user review in this fashion (e.g., can refrain from prompting the user for feedback regarding one or more node pairs). For instance, in some cases, the feedback component can prompt the user for feedback regarding only those node pairs that exhibit insufficient confidence (e.g., regarding only those node pairs whose categorical confidence scores are set to the "unconfident" category; and/or regarding only those node pairs whose real-valued scalar confidence scores fail to satisfy any suitable threshold level).

In various embodiments, the gap component of the computerized tool can electronically identify, via any suitable natural language processing techniques and based on the set of node pairs, one or more gaps between the code graph and the model graph. For instance, for any two nodes that are listed as mapped/linked/correlated in the set of node pairs, one of such two nodes can represent a specific service domain specified by the target domain model, and the other of such two nodes can represent a specific program written in the source code. In various cases, the gap component can leverage string searching to determine whether or not there exists a gap between the business capabilities of that specific service domain and the non-exposing method calls of that specific program. As a non-limiting example, the gap component can identify, via any suitable parsing technique, the business capabilities that are to be fulfilled/provided by that specific service domain. For each identified business capability, the gap component can parse through the specific program in search of at least one non-exposing method call that matches and/or satisfies the identified business capability (e.g., that includes the same keywords that are included in the description of the identified business capability). If the gap component fails to find at least one non-exposing method call for any of such identified business capabilities, the gap component can conclude that there exists a gap between the business capabilities of the specific service domain and the non-exposing method calls of the specific program, and the gap component can record and/or log that gap accordingly. As another non-limiting example, the gap component can identify, via any suitable parsing technique, the service domain interactions that are to be initiated by that specific service domain. For each identified service domain interaction, the gap component can parse through the specific program in search of at least one program-exposing method call that matches and/or satisfies the identified service domain interaction (e.g., that includes the same keywords that are included in the description of the identified service domain interaction). If the gap component fails to find at least one program-exposing method call for any of such identified service domain interactions, the gap component can conclude that there exists a gap between the service domain interactions of the specific service domain and the program-exposing method calls of the specific program, and the gap component can record and/or log that gap accordingly.

In any case, the gap component can utilize natural language processing (e.g., string searching) to identify/detect gaps between the model graph and the code graph. In various embodiments, the execution component can electronically address such gaps. In some cases, the execution component can address such gaps by generating and/or transmitting electronic warnings to any suitable computing devices, where such electronic warnings can indicate the existence of such gaps, and/or where such electronic warnings can indicate that such gaps require attention/remediation. In other cases, the execution component can address such gaps by inserting, into the source code, one or more coding templates that address and/or fill such gaps (e.g., if the source code is missing a non-exposing method call that corresponds to a particular business capability, then the execution component can insert into the source code a pre-written non-exposing method call template that performs such business capability).

Accordingly, various embodiments described herein can be considered as a computerized tool that can facilitate monolith-to-microservice refactoring based on source-code-to-domain-model graph comparison.

Various embodiments described herein can be employed to use hardware and/or software to solve problems that are highly technical in nature (e.g., to facilitate monolith-to-microservice refactoring based on source-code-to-domain-model graph comparison), that are not abstract and that cannot be performed as a set of mental acts by a human. Further, some of the processes performed can be performed by a specialized computer (e.g., source code parsers, target domain model parsers, graph convolutional neural networks). In various aspects, some defined tasks associated with various embodiments described herein can include: accessing, by a device operatively coupled to a processor, source code of a monolithic application and a target domain model corresponding to the monolithic application; and/or refactoring, by the device, the monolithic application into microservices, by aligning a first graph representing the source code with a second graph representing the target domain model.

Such defined tasks cannot be performed by the human mind without computers. Indeed, neither the human mind nor a human with pen and paper can electronically access source code and/or a target domain model of a monolithic application, electronically generate graphs (e.g., data structures having nodes/vertices and edges) to respectively represent the source code and the target domain model, and electronically refactor the monolithic application by aligning (e.g., via a common embedding space technique, such a graph convolutional neural network) the two graphs with each other. Instead, such defined tasks are inherently and inextricably tied to computer technology and cannot be implemented outside of a computing environment (e.g., a monolithic application is an executable set of programs, where each program is a set of coding commands that can be compiled and/or run; thus, a monolithic application is an inherently computerized construct that cannot exist in the human mind or on mere paper; accordingly, a computer-implemented tool that can refactor a monolithic application into microservices is likewise an inherently computerized construct that cannot exist in any reasonable, sensible, or practicable way without computers).

In various instances, one or more embodiments described herein can integrate the herein-described teachings into a practical application. As mentioned above, some techniques for facilitating monolith-to-microservice refactoring can be bottom-up techniques. Such bottom-techniques can fail to take into account external microservice information, which can cause such bottom-up techniques to produce insufficiently reliable refactoring results. As also mentioned above, other techniques for facilitating monolith-to-microservice refactoring can be top-down techniques. Although top-down techniques can implement a target domain model so as to consider external microservice information, such top-down techniques can be wholly manual processes that consumes months' worth of time. In stark contrast, embodiments described herein can include monolith-to-microservice refactoring achieved through alignment of a graph representing monolithic source code with another graph representing a target domain model. More specifically, such alignment can be facilitated by importing (e.g., via a graph convolutional neural network) both graphs into a common embedding space and then pairing/mapping/linking nodes between the two graphs based on Euclidean distance. Because such embodiments can make use of the target domain model, such embodiments can avoid the pitfalls experienced by bottom-up techniques. Moreover, because embedding-based graph alignment can be automated/computer-implemented, such embodiments can consume far less time as compared to top-down techniques. Thus, various embodiments described herein can be considered as a concrete, tangible technical improvement in the field of microservice refactoring. Furthermore, as explained above, microservice refactoring can be considered as a useful and practical end in and of itself. After all, monolithic applications, due to their immense sizes and tight internal coupling, often fail to exhibit the benefits of cloud-native applications (e.g., scalability, continuous deployment, stateless deployment, agility, ease of troubleshooting), and such failure can be addressed through the performance of microservice refactoring. Therefore, in any case, various embodiments described herein certainly constitute useful and practical applications of computers.

It should be appreciated that the figures and the herein disclosure describe non-limiting examples of various embodiments. It should further be appreciated that the figures are not necessarily drawn to scale.

FIG. 1 illustrates a block diagram of an example, non-limiting system 100 that can facilitate monolith-to-microservice refactoring via source-code-to-domain-model graph comparison in accordance with one or more embodiments described herein. As shown, a monolith-to-microservice refactoring system 102 (e.g., hereafter "refactoring system 102") can be electronically integrated, via any suitable wired and/or wireless electronic connections, with a source code 106 of a monolithic application 104 and/or with a target domain model 108 associated with the monolithic application 104.

In various aspects, the monolithic application 104 can be any suitable monolithic application. In various instances, the source code 106, which can be written in any suitable coding language and/or with any suitable coding syntax, can contain the computer-executable instructions and/or coding commands that make up the monolithic application 104. This is shown in more detail with respect to FIG. 2.

Figure 2:
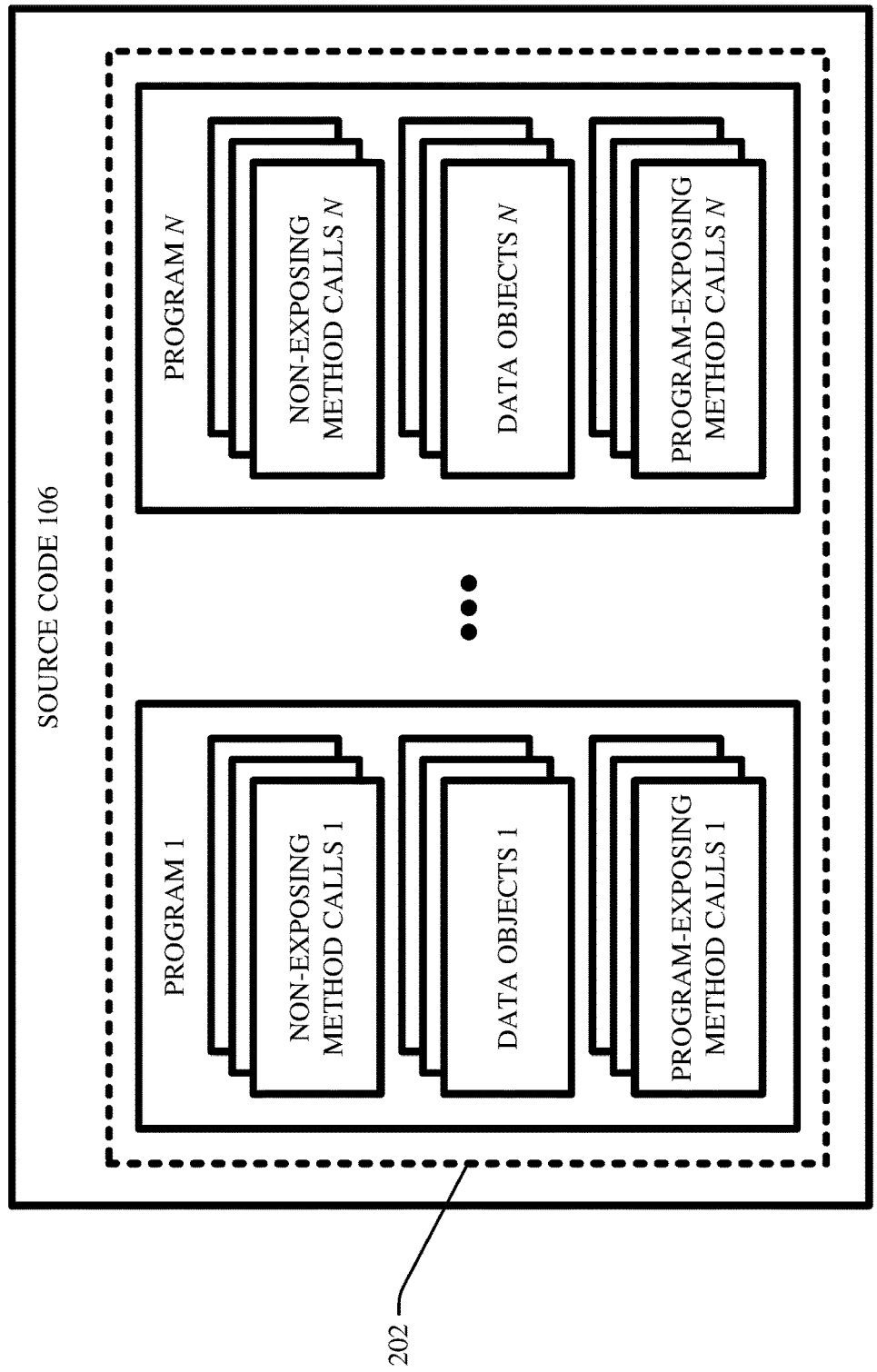
FIG. 2 illustrates an example, non-limiting block diagram of source code of a monolithic application in accordance with one or more embodiments described herein.

FIG. 2 illustrates an example, non-limiting block diagram 200 of the source code 106 in accordance with one or more embodiments described herein. As shown, the source code 106 can include a set of programs 202. In various aspects, the set of programs 202 can include n programs for any suitable positive integer n: a program 1 to a program n. In various instances, a program of the source code 106 can be a sequence of computer-executable commands that can perform any suitable number of non-exposing methods calls on any suitable number of data objects and/or that can perform any suitable number of program-exposing method calls. In various cases, a data object can be one or more scalars, one or more vectors, one or more matrices, one or more tensors, and/or one or more character strings, and a non-exposing method call can be any suitable function, operation, calculation, and/or transformation that can be performed on a data object and that can be self-contained (e.g., that can be performed without interacting with and/or invoking another program). In contrast, a program-exposing method call can be any suitable invocation, activation, and/or initiation of another program that is written within the source code 106. As a non-limiting example, the program 1 can perform any of a set of non-exposing method calls 1 on any of a set of data objects 1, where the set of non-exposing method calls 1 can include any suitable number of any suitable types of non-exposing method calls, and where the set of data objects 1 can include any suitable number of any suitable types of data objects. Moreover, as shown, the program 1 can perform any of a set of program-exposing method calls 1, each of which can invoke/activate any of the other n−1 programs that are written in the source code 106. As another non-limiting example, the program n can perform any of a set of non-exposing method calls n on any a set of data objects n, where the set of non-exposing method calls n can include any suitable number of any suitable types of non-exposing method calls, and where the set of data objects n can include any suitable number of any suitable types of data objects. Furthermore, as shown, the program n can perform any of a set of program-exposing method calls n, each of which can invoke/activate any of the other n−1 programs that are written in the source code 106.

For purposes of illustration/explanation, suppose that there are a total of p program-exposing method calls written within the source code 106, for any suitable positive integer p.

In various aspects, the target domain model 108 can be any suitable electronic document that can specify, describe, and/or otherwise define (e.g., in natural language text) the capabilities and/or transactional structure that are expected to be provided by the monolithic application 104. This is shown in more detail with respect to FIG. 3.

Figure 3:
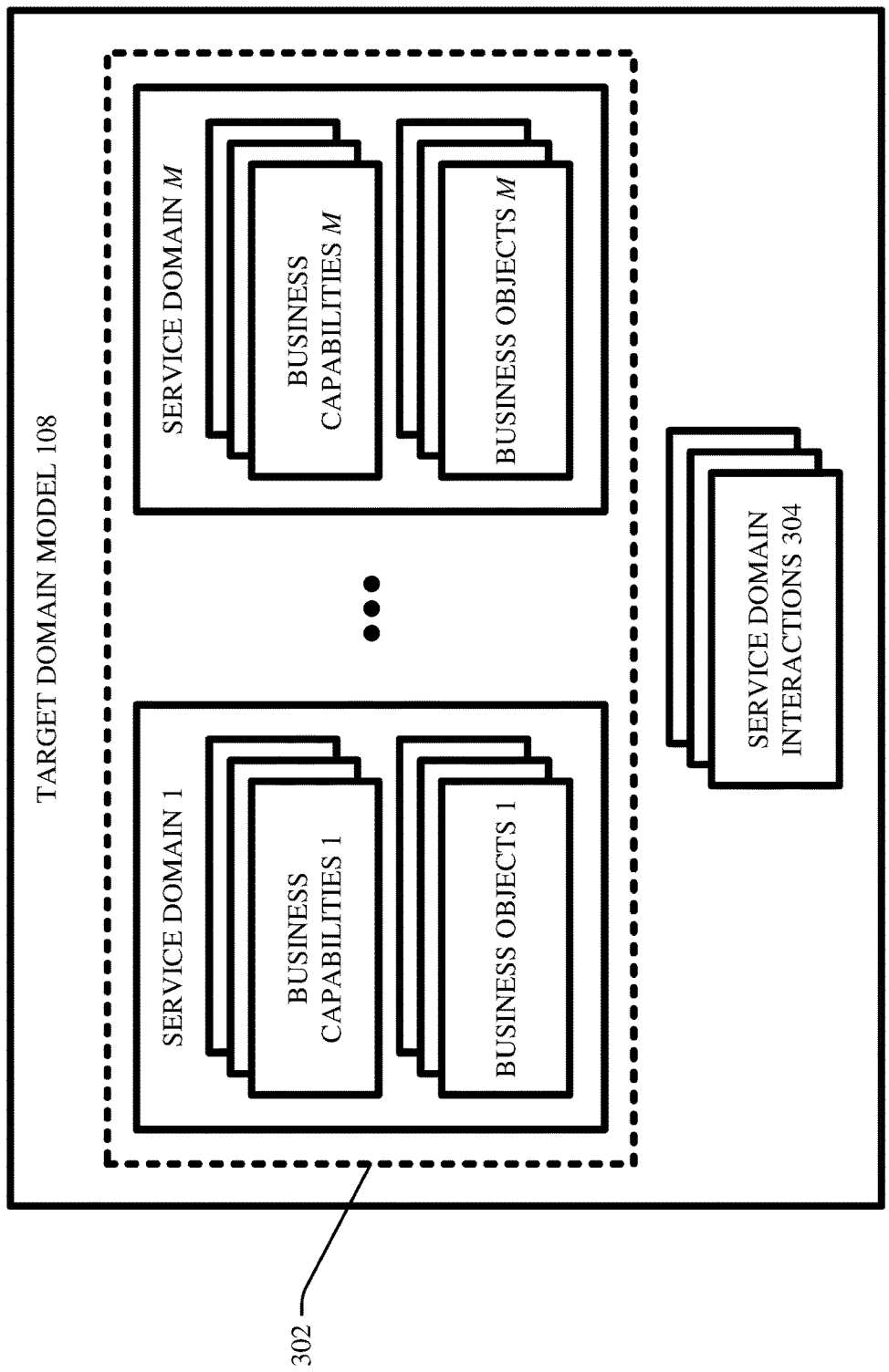
FIG. 3 illustrates an example, non-limiting block diagram of a target domain model in accordance with one or more embodiments described herein.

FIG. 3 illustrates an example, non-limiting block diagram 300 of the target domain model 108 in accordance with one or more embodiments described herein. As shown, the target domain model 108 can include a set of service domains 302. In various aspects, the set of service domains 302 can include m service domains for any suitable positive integer m: a service domain 1 to a service domain m. In some cases, m can be equal to n. In other cases, m can be unequal to n. In various instances, a service domain can be a description and/or specification of a cohesive cluster of business logic that is desired, expected, and/or otherwise supposed to perform a set of business capabilities on a set of business objects. In various cases, a business object can be a description/specification of any suitable piece of electronic data, and a business capability can be a description/specification of any suitable function, operation, calculation, and/or transformation that can be performed on a business object. Accordingly, in various instances, a business capability can be considered as a natural language analogue to and/or description of a non-exposing method call, and a business object can be considered as a natural language analogue to and/or a description of a data object. As a non-limiting example, as shown, the service domain 1 can be expected to perform any of a set of business capabilities 1 on any of a set of business objects 1, where the set of business capabilities 1 can include any suitable number of any suitable types of business capabilities, and where the set of business objects 1 can include any suitable number of any suitable types of business objects. Likewise, as shown, the service domain m can be expected to perform any of a set of business capabilities m on any of a set of business objects m, where the set of business capabilities m can include any suitable number of any suitable types of business capabilities, and where the set of business objects m can include any suitable number of any suitable types of business objects.

As further shown, the target domain model 108 can include a set of service domain interactions 304. In various aspects, the set of service domain interactions 304 can be a description/specification of which service domains in the target domain model 108 are supposed to call upon (e.g., are supposed to invoke, activate, and/or initiate) which other service domains in the target domain model 108. Accordingly, in various cases, a service domain interaction can be considered as a natural language analogue to and/or description of a program-exposing method call.

Although not explicitly shown in FIG. 3, the set of service domains 302 can be specified/described in a swagger definition portion of the target domain model 108, whereas the set of service domain interactions 304 can be specified/described in transactional/process flow portion of the target domain model 108. As those having ordinary skill in the art will appreciate, some non-limiting example embodiments of the target domain model 108 can be a BIAN specification and/or an eTOM specification.

For purposes of illustration/explanation, suppose that there are a total of q service domain interactions specified by the target domain model 108, for any suitable positive integer q. In some cases, q can be equal top. In other cases, q can be unequal top.

Although not explicitly shown in FIG. 3, each of the set of service domains 302 can be known and/or otherwise deemed to correspond to a respective microservice. For example, there can be a specific microservice which is known to facilitate and/or perform the set of business capabilities 1. Accordingly, that specific microservice can be considered as corresponding to and/or otherwise satisfying the service domain 1. As another example, there can be a particular microservice that is known to facilitate/perform the set of business capabilities m. Thus, that particular microservice can be considered as corresponding to and/or otherwise satisfying the service domain m. Therefore, each service domain specified in the target domain model 108 can be known/deemed to be associated with a microservice.

Returning back to FIG. 1, it can be desired to refactor the monolithic application 104 into microservices. As described herein, the refactoring system 102 can automatically facilitate such refactoring, by leveraging both the source code 106 and the target domain model 108.

In various embodiments, the refactoring system 102 can comprise a processor 110 (e.g., computer processing unit, microprocessor) and a non-transitory computer-readable memory 112 that is operably connected and/or coupled to the processor 110. The memory 112 can store computer-executable instructions which, upon execution by the processor 110, can cause the processor 110 and/or other components of the refactoring system 102 (e.g., access component 114, graph component 116, mapping component 118, feedback component 120, gap component 122, execution component 124) to perform one or more acts. In various embodiments, the memory 112 can store computer-executable components (e.g., access component 114, graph component 116, mapping component 118, feedback component 120, gap component 122, execution component 124), and the processor 110 can execute the computer-executable components.

In various embodiments, the refactoring system 102 can comprise an access component 114. In various aspects, the access component 114 can electronically receive and/or otherwise electronically access the source code 106 and/or the target domain model 108. In various instances, the access component 114 can electronically retrieve and/or obtain the source code 106 and/or the target domain model 108 from any suitable centralized and/or decentralized data structures, whether remote from and/or local to the access component 114. In any case, the access component 114 can electronically access the source code 106 and/or the target domain model 108, such that other components of the refactoring system 102 can electronically interact with the source code 106 and/or with the target domain model 108.

In various embodiments, the refactoring system 102 can further comprise a graph component 116. In various aspects, as described herein, the graph component 116 can generate a code graph based on the source code 106 and/or can generate a model graph based on the target domain model 108.

In various embodiments, the refactoring system 102 can further comprise a mapping component 118. In various instances, as described herein, the mapping component can align the code graph with the model graph, thereby yielding a set of node pairs. In various cases, the set of node pairs can be considered as indicating which programs of the source code 106 are correlated with which service domains of the target domain model 108. Since each service domain can be known/deemed to correspond to a microservice, the set of node pairs can accordingly be considered as correlating microservices to the programs of the source code 106.

In various embodiments, the refactoring system 102 can further comprise a feedback component 120. In various aspects, as described herein, the feedback component 120 can prompt and/or access user-provided feedback to confirm and/or reject any of the set of node pairs.

In various embodiments, the refactoring system 102 can further comprise a gap component 122. In various instances, as described herein, the gap component 122 can detect, via natural language processing and based on the set of node pairs, one or more gaps (e.g., one or more mismatches) between the code graph and the model graph.

In various embodiments, the refactoring system 102 can further comprise an execution component 124. In various cases, as described herein, the execution component 124 can transmit to any suitable computing device and/or render on any suitable computer display any of the set of node pairs. In various other cases, as described herein, the execution component 124 can insert one or more coding templates into the source code 106, so as to plug and/or fill the one or more gaps identified by the gap component 122.

Figure 4:
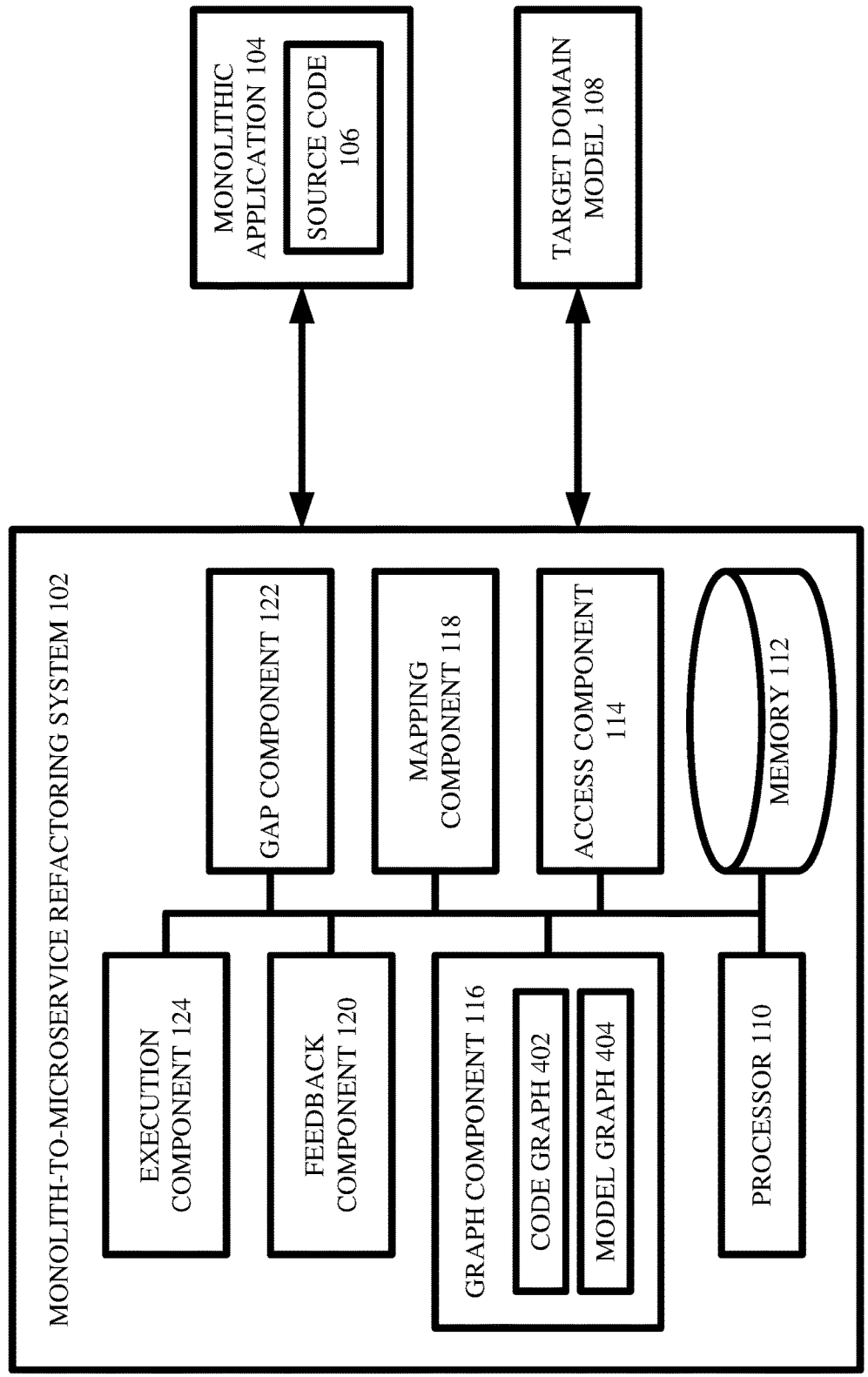
FIG. 4 illustrates a block diagram of an example, non-limiting system including a code graph and/or a model graph that facilitates monolith-to-microservice refactoring via source-code-to-domain-model graph comparison in accordance with one or more embodiments described herein.

FIG. 4 illustrates a block diagram of an example, non-limiting system 400 including a code graph and/or a model graph that can facilitate monolith-to-microservice refactoring via source-code-to-domain-model graph comparison in accordance with one or more embodiments described herein. As shown, the system 400 can, in some cases, comprise the same components as the system 100, and can further comprise a code graph 402 and/or a model graph 404.

In various embodiments, the graph component 116 can electronically generate the code graph 402 based on the source code 106. More specifically, the graph component 116 can electronically parse the source code 106. In some cases, such parsing can be static. That is, such parsing can occur before runtime of and/or otherwise without running/executing the source code 106. In other cases, such parsing can be dynamic. That is, such parsing can occur during and/or after runtime/execution of the source code 106. In yet other cases, such parsing can be both static and dynamic. In any case, by parsing through the source code 106, the graph component 116 can identify the set of programs 202, can identify each non-exposing method call which each of the set of programs 202 is configured to perform, can identify each data object which each of the set of programs 202 is configured to manipulate/consider, and/or can identify each program-exposing method call which each of the set of programs 202 is configured to perform. In various aspects, the graph component 116 can generate the code graph 402 based on such identifications. As a non-limiting example, each node of the code graph 402 can represent a respective one of the set of programs 202 written in the source code 106, and each edge of the code graph 402 can represent a respective program-exposing method call that is written within the source code 106.

Similarly, in various embodiments, the graph component 116 can electronically generate the model graph 404 based on the target domain model 108. In particular, the graph component 116 can electronically parse the target domain model 108. As above, such parsing can be static in some cases, can be dynamic in other cases, and/or can be both static and dynamic in yet other cases. In any case, by parsing through the target domain model 108, the graph component 116 can identify the set of service domains 302, can identify each business capability specified/defined for each of the set of service domains 302, can identify each business object specified/defined for each of the set of service domains 302, and/or can identify each of the set of service domain interactions 304. In various aspects, the graph component 116 can generate the model graph 404 based on such identifications. As a non-limiting example, each node of the model graph 404 can represent a respective one of the set of service domains 302 specified by the target domain model 108, and each edge of the model graph 404 can represent a respective one of the set of service domain interactions 304 specified by the target domain model 108.

Figure 5:
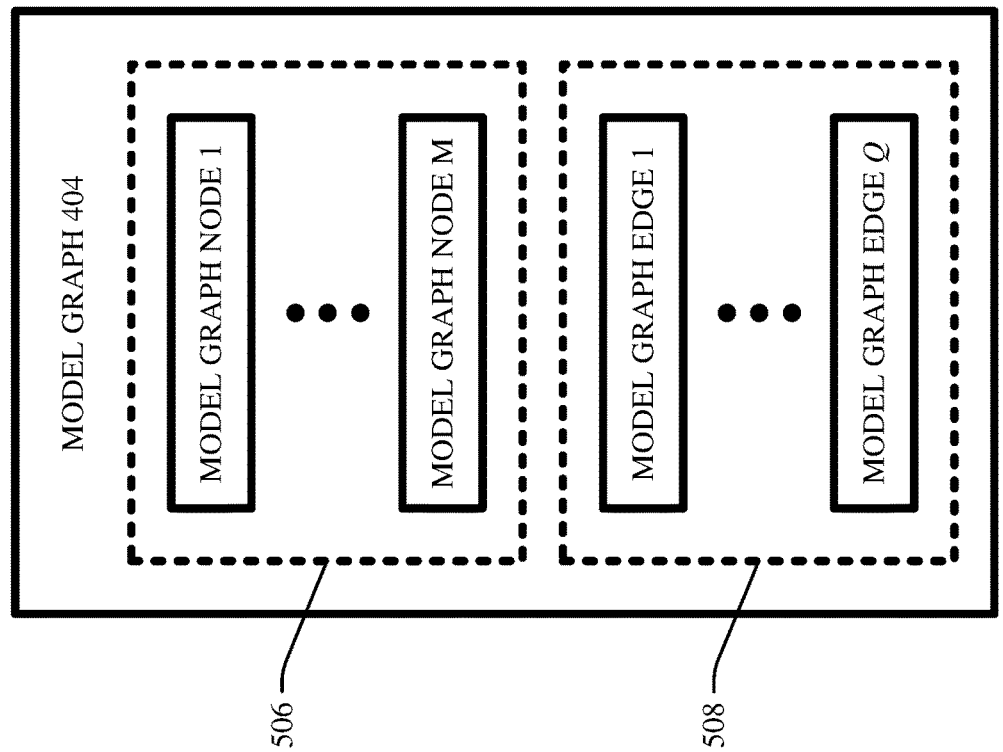
FIGS. 5-7 illustrate example, non-limiting block diagrams of a code graph and/or a model graph in accordance with one or more embodiments described herein.
Figure 5:
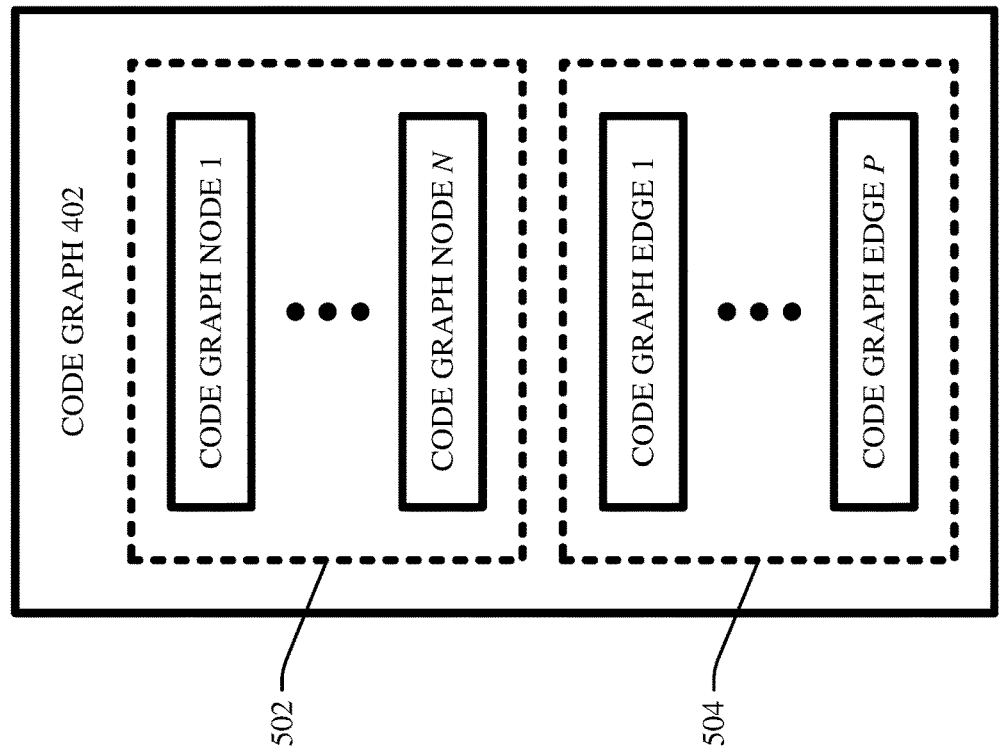
Figure 6:
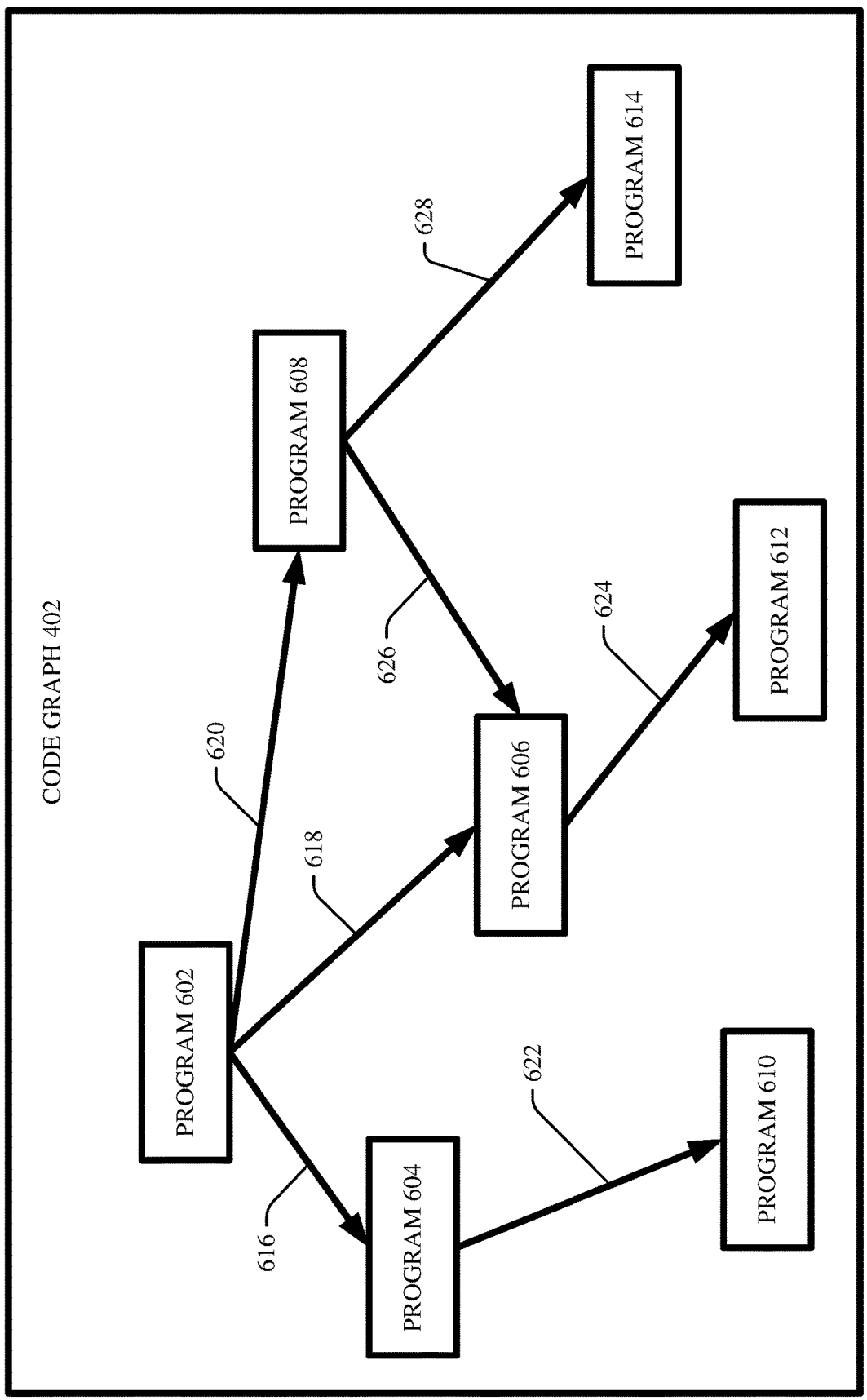
Figure 7:
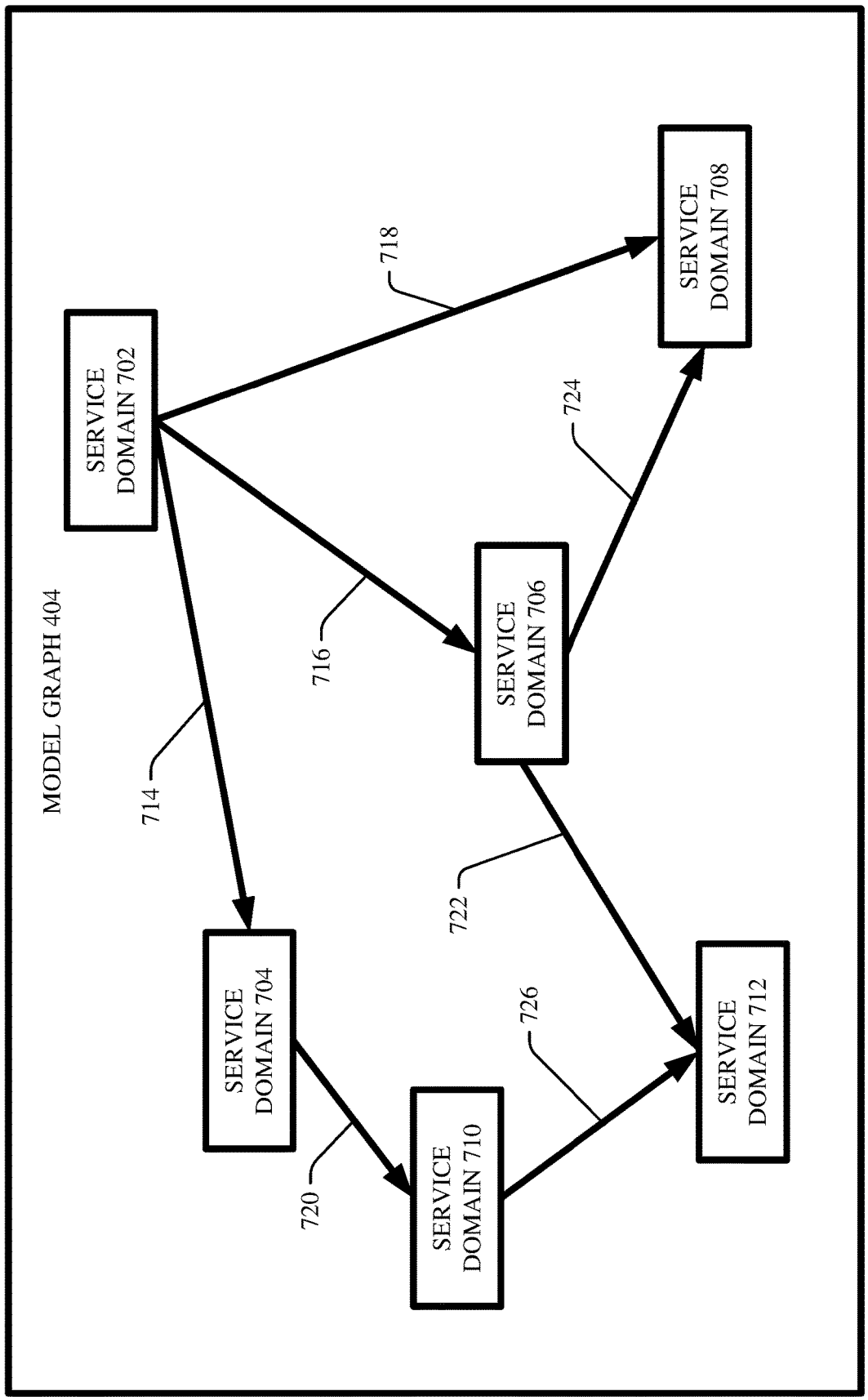

This is further discussed with respect to FIGS. 5-7.

First, consider FIG. 5. As shown, FIG. 5 depicts a non-limiting block diagram 500 showing additional example details of the code graph 402 and/or the model graph 404. In various aspects, as shown, the code graph 402 can include a set of code graph nodes 502 and/or a set of code graph edges 504. In various instances, as mentioned above, the code graph 402 can include one unique node per unique program that is written within the source code 106. Accordingly, because there can be n programs in the source code 106, there can be n nodes in the set of code graph nodes 502: a code graph node I which can represent the program 1, to a code graph node n which can represent the program n. In various cases, as also mentioned above, the code graph 402 can include one unique edge per unique program-exposing method call that is written within the source code 106. Thus, because there can be p program-exposing method calls in the source code 106, there can be p edges in the set of code graph edges 504: a code graph edge 1 which can represent a first program-exposing method call written in the source code 106, to a code graph edge p which can represent a p-th program-exposing method call written in the source code 106.

Likewise, in various aspects, the model graph 404 can include a set of model graph nodes 506 and/or a set of model graph edges 508. In various instances, as mentioned above, the model graph 404 can include one unique node per unique service domain that is specified within the target domain model 108. Accordingly, because there can be m service domains in the target domain model 108, there can be m nodes in the set of model graph nodes 506: a model graph node I which can represent the service domain 1, to a model graph node m which can represent the service domain m. In various cases, as also mentioned above, the model graph 404 can include one unique edge per unique service domain interaction that is specified within the target domain model 108. Thus, because there can be q service domain interactions in the target domain model 108, there can be q edges in the set of model graph edges 508: a model graph edge 1 which can represent a first service domain interaction specified in the target domain model 108, to a model graph edge q which can represent a q-th service domain interaction specified in the target domain model 108.

Next, consider FIG. 6. FIG. 6 illustrates an example, non-limiting view 600 of the code graph 402. For purposes of explanation, suppose that the source code 106 includes seven programs: a program 602, a program 604, a program 606, a program 608, a program 610, a program 612, and a program 614. Furthermore, suppose that the source code 106 includes seven program-exposing method calls: a program-exposing method call 616 from the program 602 to the program 604, a program-exposing method call 618 from the program 602 to the program 606, a program-exposing method call 620 from the program 602 to the program 608, a program-exposing method call 622 from the program 604 to the program 610, a program-exposing method call 624 from the program 606 to the program 612, a program-exposing method call 626 from the program 608 to the program 606, and a program-exposing method call 628 from the program 608 to the program 614. In such case, as shown, the code graph 402 can include: a node representing the program 602, a node representing the program 604, a node representing the program 606, a node representing the program 608, a node representing the program 610, a node representing the program 612, and a node representing the program 614. Furthermore, in such case and as shown, the code graph 402 can include: a directed edge pointing from the node representing the program 602 to the node representing the program 604, a directed edge pointing from the node representing the program 602 to the node representing the program 606, a directed edge pointing from the node representing the program 602 to the node representing the program 608, a directed edge pointing from the node representing the program 604 to the node representing the program 610, a directed edge pointing from the node representing the program 606 to the node representing the program 612, a directed edge pointing from the node representing the program 608 to the node representing the program 606, and a directed edge pointing from the node representing the program 608 to the node representing the program 614. In this way, the graph component 116 can build the code graph 402 by parsing the source code 106 and by identifying the programs and the program-exposing method calls written in the source code 106.

Now, consider FIG. 7. FIG. 7 illustrates an example, non-limiting view 700 of the model graph 404. For purposes of explanation, suppose that the target domain model 108 includes six service domains: a service domain 702, a service domain 704, a service domain 706, a service domain 708, a service domain 710, and a service domain 712. Furthermore, suppose that the target domain model 108 includes seven service domain interactions: a service domain interaction 714 from the service domain 702 to the service domain 704, a service domain interaction 716 from the service domain 702 to the service domain 706, a service domain interaction 718 from the service domain 702 to the service domain 708, a service domain interaction 720 from the service domain 704 to the service domain 710, a service domain interaction 722 from the service domain 706 to the service domain 712, a service domain interaction 724 from the service domain 706 to the service domain 708, and a service domain interaction 726 from the service domain 710 to the service domain 712. In such case, as shown, the model graph 404 can include: a node representing the service domain 702, a node representing the service domain 704, a node representing the service domain 706, a node representing the service domain 708, a node representing the service domain 710, and a node representing the service domain 712. Furthermore, in such case and as shown, the model graph 404 can include: a directed edge pointing from the node representing the service domain 702 to the node representing the service domain 704, a directed edge pointing from the node representing the service domain 702 to the node representing the service domain 706, a directed edge pointing from the node representing the service domain 702 to the node representing the service domain 708, a directed edge pointing from the node representing the service domain 704 to the node representing the service domain 710, a directed edge pointing from the node representing the service domain 706 to the node representing the service domain 712, a directed edge pointing from the node representing the service domain 706 to the node representing the service domain 708, and a directed edge pointing from the node representing the service domain 710 to the node representing the service domain 712. In this way, the graph component 116 can build the model graph 404 by parsing the target domain model 108 and by identifying the service domains and the service domain interactions specified in the target domain model 108.

Although not explicitly shown in the figures, the nodes and/or edges in the code graph 402 can be unweighted in some cases, and/or can be weighted according to program attributes/properties in other cases. As some non-limiting examples, node attributes of the code graph 402 can include: an entrypoint association attribute (e.g., for any given programs i and j in the source code 106, this attribute can indicate whether the program j acts as an entrypoint for the program i); a common entrypoint attribute (e.g., for any given programs i and j in the source code 106, this attribute can indicate whether the programs i and j have a same entrypoint as each other); an inheritance attribute (e.g., for any given programs i and j in the source code 106, this attribute can indicate whether there is an inheritance relationship between the programs i and j); and/or a data object attribute (e.g., for any given programs i and j in the source code 106, this attribute can indicate whether the programs i and j operate on a same data object as each other). Likewise, although not explicitly shown in the figures, the nodes and/or edges in the model graph 404 can be unweighted in some cases, and/or can be weighted according to service domain attributes/properties in other cases. As some non-limiting examples, node attributes of the model graph 404 can include: an entrypoint association attribute (e.g., for any given service domains i and j in the target domain model 108, this attribute can indicate whether the service domain j acts as an entrypoint for the service domain i); a common entrypoint attribute (e.g., for any given service domains i and j in the target domain model 108, this attribute can indicate whether the service domains i and j have a same entrypoint as each other); an inheritance attribute (e.g., for any given service domains i and j in the target domain model 108, this attribute can indicate whether there is an inheritance relationship between the service domains i and j); and/or a business object attribute (e.g., for any given service domains i and j in the target domain model 108, this attribute can indicate whether the service domains i and j operate on a same business object as each other).

Moreover, the graph component 116 can, in various aspects and as explained above, parse the source code 106 dynamically. More specifically, the graph component 116 can analyze the source code 106 during runtime of the source code 106, thereby yielding different execution traces and/or production logs of the source code 106. In various instances, such different execution traces and/or production logs can indicate different sequences of program-to-program interactions that are implementable by the source code 106 (e.g., can indicate different orders in which the source code 106 can execute the set of programs 202 in different contexts). In some cases, such different sequences of program-to-program interactions can be referred to as different program transactions. In any case, edge weights of the code graph 402 can be based on such different sequences of program-to-program interactions. For example, some program-exposing method calls can be present in larger proportions of such different sequences of program-to-program interactions. Thus, edges of the code graph 402 that represent such more-frequently-executed program-exposing method calls can have heavier weights. On the other hand, some program-exposing method calls can be present in smaller proportions of such different sequences of program-to-program interactions. Thus, edges of the code graph 402 that represent such less-frequently-executed program-exposing method calls can have lighter weights.

Figure 8:
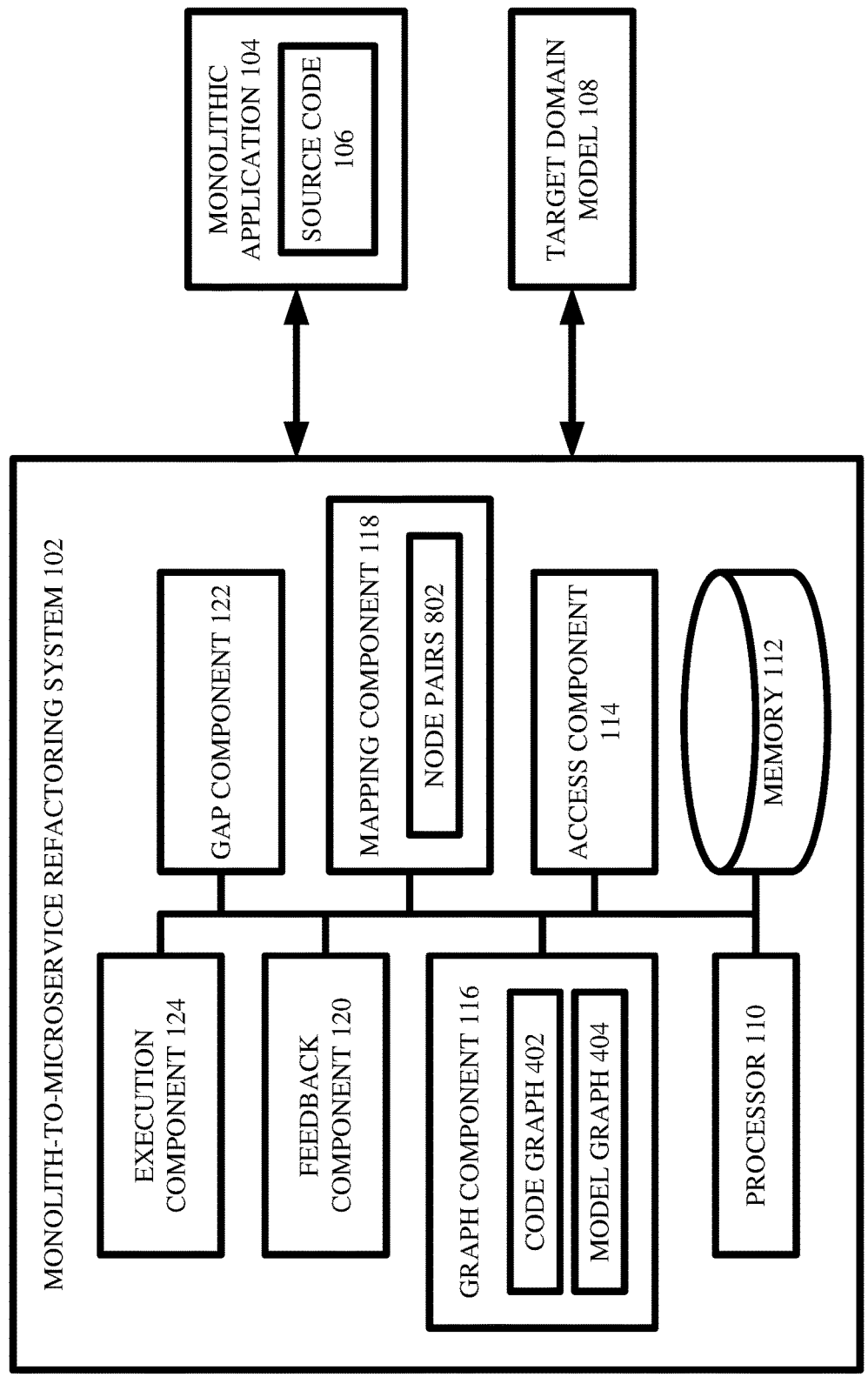
FIG. 8 illustrates a block diagram of an example, non-limiting system including a set of node pairs that facilitates monolith-to-microservice refactoring via source-code-to-domain-model graph comparison in accordance with one or more embodiments described herein.

FIG. 8 illustrates a block diagram of an example, non-limiting system 800 including a set of node pairs that can facilitate monolith-to-microservice refactoring via source-code-to-domain-model graph comparison in accordance with one or more embodiments described herein. As shown, the system 800 can, in some cases, comprise the same components as the system 400, and can further comprise a set of node pairs 802.

In various embodiments, the mapping component 118 can electronically generate the set of node pairs 802, based on the code graph 402 and the model graph 404. More specifically, the mapping component 118 can align the code graph 402 with the model graph 404, so as to identify which nodes of the code graph 402 are most similar to which nodes of the model graph 404, and the result of such alignment can be the set of node pairs 802. In some instances, the mapping component 118 can facilitate such alignment by implementing a common embedding space technique. This is explained in more detail with respect to FIGS. 9-12.

Figure 9:
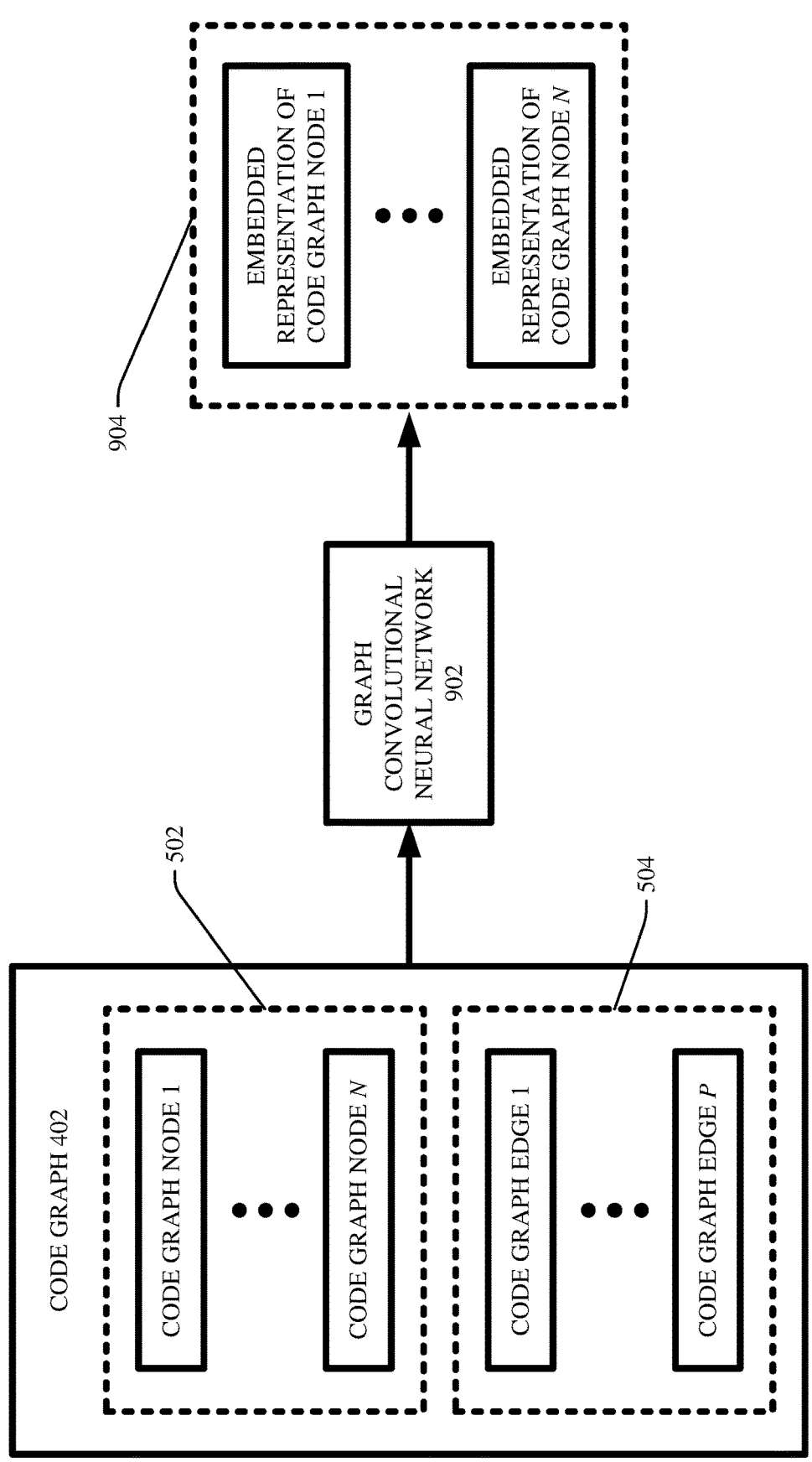
FIGS. 9-12 illustrate example, non-limiting block diagrams showing how a set of node pairs can be generated based on a code graph and/or a model graph in accordance with one or more embodiments described herein.

First, consider FIG. 9, which illustrates an example, non-limiting block diagram 900 showing how the code graph 402 can be imported into an embedding space. In various embodiments, the mapping component 118 can electronically store, electronically maintain, electronically control, and/or otherwise electronically access a graph convolutional neural network 902 (e.g., hereafter "GCN 902"). In various aspects, the GCN 902 can exhibit any suitable internal architecture. That is, the GCN 902 can include any suitable number and/or types of layers, any suitable numbers of neurons in various layers, any suitable activation functions in various neurons, and/or any suitable interneuron-connections. In any case, the GCN 902 can be configured to receive as input a graph and to produce as output embedded node-wise representations of the inputted graph. As those having ordinary skill in the art will appreciate, an embedded representation of a graph node can be a vector having any suitable dimensionality (e.g., any suitable number of elements), such that the values/magnitudes of the elements of that vector can depend upon the attributes, properties, and/or edges of that graph node. As those having ordinary skill in the art will further appreciate, the GCN 902 can learn to generate accurate embedded node-wise representations by undergoing any suitable type/paradigm of training (e.g., supervised training, unsupervised training, reinforcement learning), with any suitable training batch sizes, with any suitable objective functions, and/or with any suitable training termination criterion.

Accordingly, in various aspects, the mapping component 118 can execute the GCN 902 on the code graph 402, and the result can be a set of embedded node-wise representations 904. More specifically, an input layer of the GCN 902 can receive the code graph 402, the code graph 402 can complete a forward pass through one or more hidden layers of the GCN 902, and an output layer of the GCN 902 can compute the set of embedded node-wise representations 904 based on activations generated by the one or more hidden layers. In various instances, as shown, the set of embedded node-wise representations 904 can respectively correspond to the set of code graph nodes 502. That is, because the set of code graph nodes 502 can include n nodes, the set of embedded node-wise representations 904 can include n embeddings: an embedded representation of the code graph node 1 to an embedded representation of the code graph node n. As mentioned above, the embedded representation of the code graph node 1 can be a real-valued vector having any suitable dimensionality, where the elements of such vector can depend upon the attributes, properties, and/or edges of the code graph node 1. Similarly, the embedded representation of the code graph node n can be a real-valued vector having any suitable dimensionality, where the elements of such vector can depend upon the attributes, properties, and/or edges of the code graph node n. In various cases, each of the set of embedded node-wise representations 904 can have the same dimensionality as each other.

Figure 10:
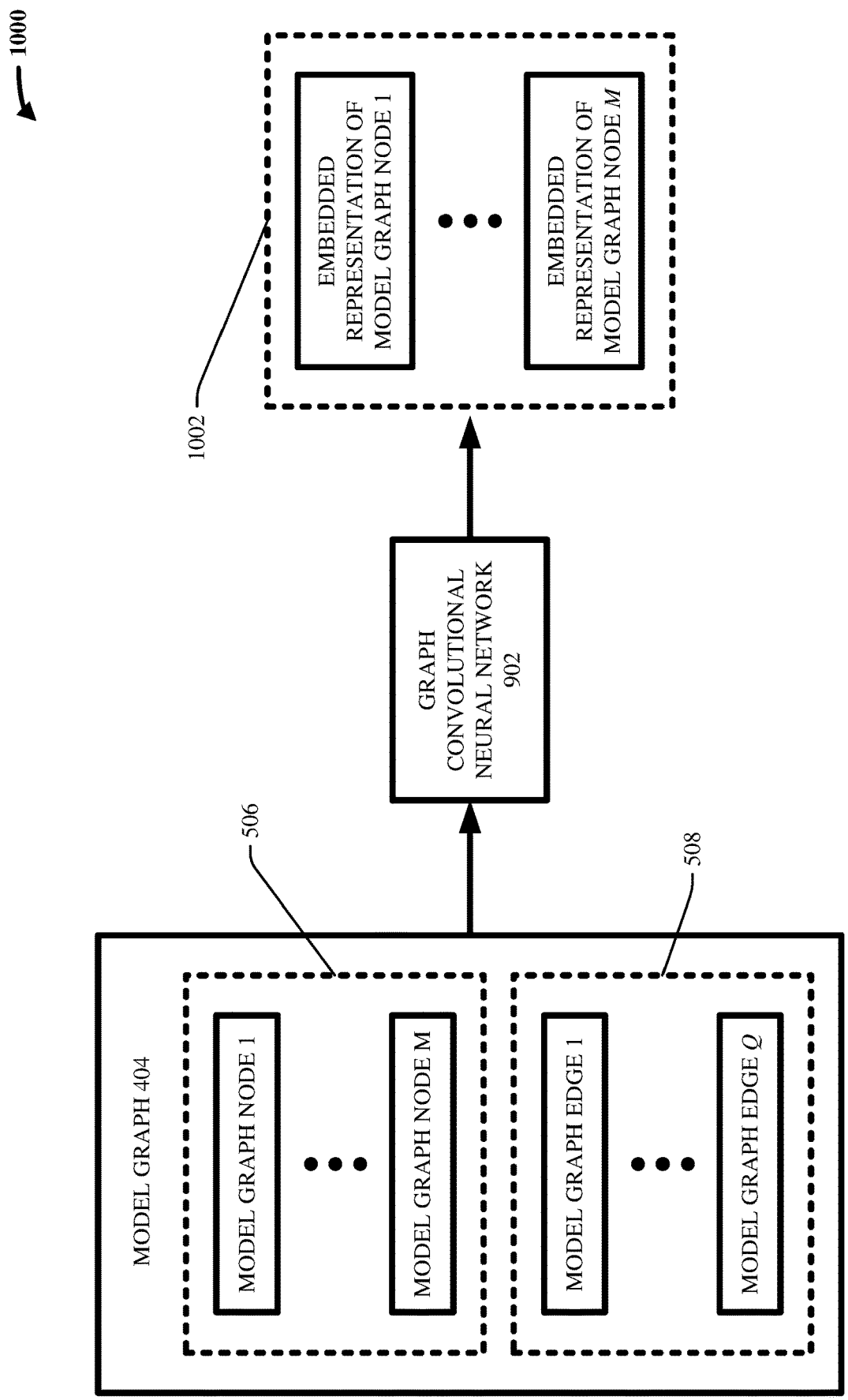

Now, consider FIG. 10, which illustrates an example, non-limiting block diagram 1000 showing how the model graph 404 can be imported into the same embedding space as the code graph 402. In various embodiments, as shown, the mapping component 118 can execute the GCN 902 on the model graph 404, and the result can be a set of embedded node-wise representations 1002. More specifically, the input layer of the GCN 902 can receive the model graph 404, the model graph 404 can complete a forward pass through the one or more hidden layers of the GCN 902, and the output layer of the GCN 902 can compute the set of embedded node-wise representations 1002 based on activations generated by the one or more hidden layers. In various instances, as shown, the set of embedded node-wise representations 1002 can respectively correspond to the set of model graph nodes 506. That is, because the set of model graph nodes 506 can include m nodes, the set of embedded node-wise representations 1002 can include m embeddings: an embedded representation of the model graph node 1 to an embedded representation of the model graph node m. Just as above, the embedded representation of the model graph node 1 can be a real-valued vector having any suitable dimensionality, where the elements of such vector can depend upon the attributes, properties, and/or edges of the model graph node 1. Likewise, the embedded representation of the model graph node m can be a real-valued vector having any suitable dimensionality, where the elements of such vector can depend upon the attributes, properties, and/or edges of the model graph node m. In various cases, each of the set of embedded node-wise representations 1002 can have the same dimensionality as each other.

Because both the set of embedded node-wise representations 904 and the set of embedded node-wise representations 1002 can be generated by the GCN 902, each of the set of embedded node-wise representations 1002 can have the same dimensionality as each of the set of embedded node-wise representations 904, such that vector arithmetic can be performed between the set of embedded node-wise representations 904 and the set of embedded node-wise representations 1002. In other words, the GCN 902 can be considered as importing the code graph 402 and the model graph 404 into a common embedding space, such that the embedded representations of the code graph 402 can be compared to the embedded representations of the model graph 404. In still other words, when given a node from the model graph 404 and another node from the code graph 402, the embedded representations of those two nodes can be similar when those two nodes have similar attributes, properties, and/or edges, and the embedded representations of those two nodes can be dissimilar when those two nodes have dissimilar attributes, properties, and/or edges.

Although the herein disclosure mainly describes embodiments where the mapping component 118 generates the set of embedded node-wise representations 904 and/or the set of embedded node-wise representations 1002 via the GCN 902, this is a mere non-limiting example for ease of illustration. In various aspects, the mapping component 118 can implement any other suitable embedded representation learning technique to generate the set of embedded node-wise representations 904 and/or the set of embedded node-wise representations 1002.

Figure 11:
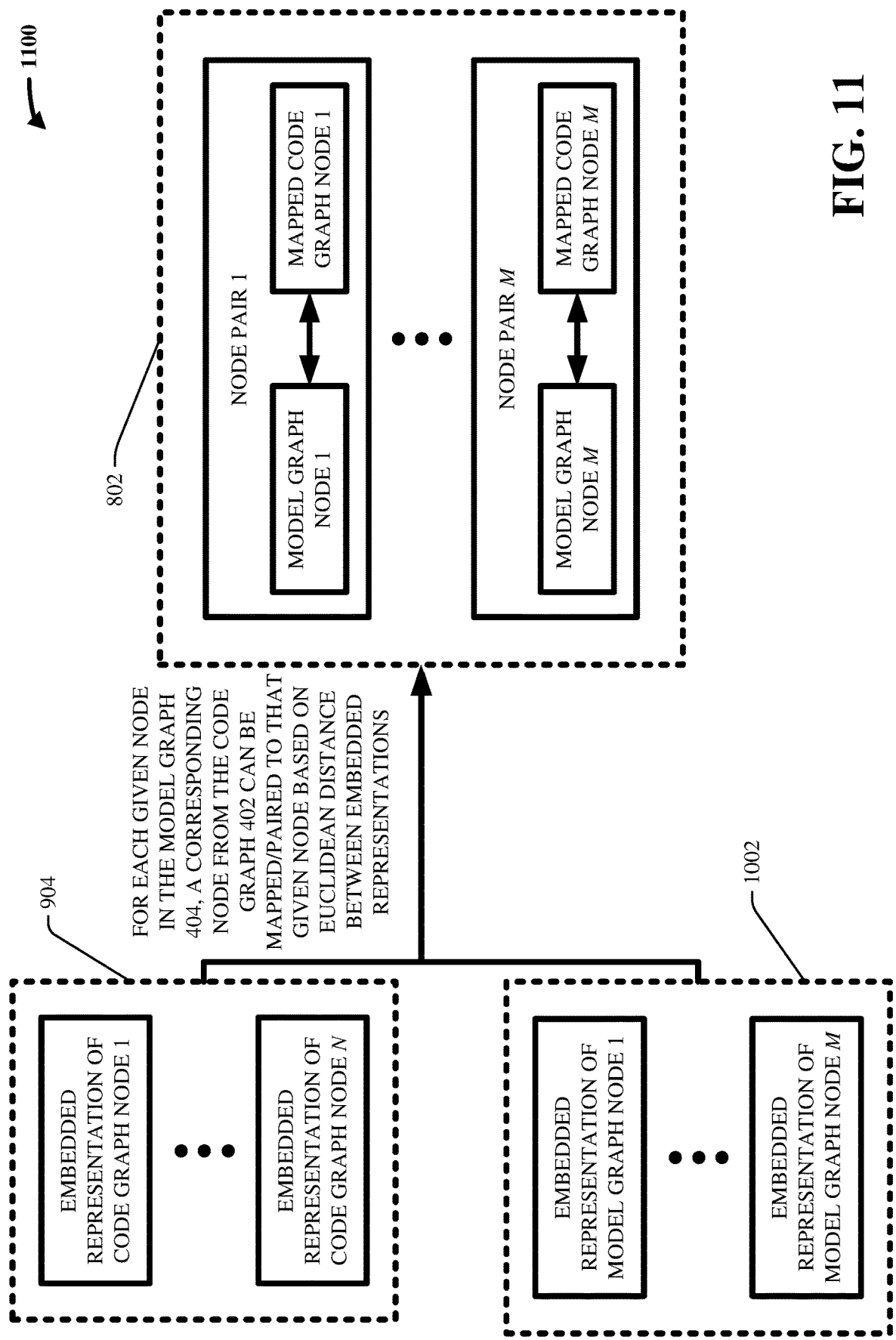

Now, consider FIG. 11, which illustrates an example, non-limiting block diagram 1100 showing how the set of node pairs 802 can be generated based on the set of embedded node-wise representations 904 and/or the set of embedded node-wise representations 1002.

In various embodiments, as shown, the mapping component 118 can generate the set of node pairs 802 by analyzing Euclidean distances that separate various ones of the set of embedded node-wise representations 1002 from various ones of the set of embedded node-wise representations 904. More specifically, the mapping component 118 can iterate through each node of the model graph 404 (e.g., can iterate through each of the set of model graph nodes 506). For each specific node in the model graph 404, the mapping component 118 can identify a node in the code graph 402 (e.g., can identify one of the set of code graph nodes 502), such that the embedded representation of the identified node from the code graph 402 is closest and/or nearest, in terms of Euclidean distance, to the embedded representation of the specific node from the model graph 404. Accordingly, the mapping component 118 can mark and/or record in the set of node pairs 802 that such specific node from the model graph 404 is mapped, linked, and/or otherwise correlated with the identified node from the code graph 402. This can cause the set of node pairs 802 to have a total of m node pairs: a node pair 1 to a node pair m (e.g., one node pair per model graph node).

For example, the mapping component 118 can identify whichever node in the code graph 402 has an embedded representation that is nearest/closest to the embedded representation of the model graph node 1, and such identified node can be referred to as a mapped code graph node 1 (note that such identified node is not necessarily the code graph node 1 shown in FIG. 5). In various instances, the mapping component 118 can thus create a node pair 1 in the set of node pairs 802, where the node pair 1 can be any suitable electronic record indicating that the model graph node 1 is linked/correlated with the mapped code graph node 1.

As another example, the mapping component 118 can identify whichever node in the code graph 402 has an embedded representation that is nearest/closest to the embedded representation of the model graph node m, and such identified node can be referred to as a mapped code graph node m (note that such identified node is not necessarily the code graph node m shown in FIG. 5). In various cases, just as above, the mapping component 118 can thus create a node pair m in the set of node pairs 802, where the node pair m can be any suitable electronic record indicating that the model graph node m is linked/correlated with the mapped code graph node m.

Although the herein disclosure mainly describes various embodiments in which the mapping component 118 generates the set of node pairs 802 via a common embedding space technique (e.g., via the GCN 902), this is a mere non-limiting example for ease of explanation. In various instances, the mapping component 118 can generate the set of node pairs 802 by utilizing any other suitable graph alignment technique, such as a subgraph kernel technique.

In any case, because the set of node pairs 802 can map/link/correlate nodes of the code graph 402 to nodes of the model graph 404, because nodes of the code graph 402 can represent programs written within the source code 106, and because nodes of the model graph 404 can represent service domains specified by the target domain model 108, the set of node pairs 802 can thus be considered as mapping/linking/correlating programs written in the source code 106 to service domains specified by the target domain model 108. Moreover, because each service domain specified in the target domain model 108 can be known/deemed to correspond to a microservice, the set of node pairs 802 can thus be considered as indicating which programs written in the source code 106 correspond to (e.g., perform the same functionalities as and thus can be replaced and/or substituted by) which known microservices.

As a non-limiting example, the node pair 1 can indicate that the model graph node 1 is linked/correlated to the mapped code graph node 1. This can be considered as indicating/conveying that the service domain 1 (and thus the microservice that is known/deemed to correspond to the service domain 1) is linked/correlated to the program represented by the mapped code graph node 1. Similarly, as another non-limiting example, the node pair m can indicate that the model graph node m is linked/correlated to the mapped code graph node m. This can be considered as indicating/conveying that the service domain m (and thus the microservice that is known/deemed to correspond to the service domain m) is linked/correlated to the program represented by the mapped code graph node m.

In any case, the set of node pairs 802 can be considered indicating which programs of the source code 106 correspond to which known microservices. Therefore, the set of node pairs 802 can be considered as indicating how the monolithic application 104 can be refactored into microservices. That is, the set of node pairs 802 can be considered as the results that are obtained when microservice refactoring is performed/facilitated on the monolithic application 104.

Note that, in various cases, the set of node pairs 802 can, but need not, be a one-to-one mapping between nodes of the model graph 404 and nodes of the code graph 402. For example, it can be the case that a node in the code graph 402 can be not mapped/linked/correlated to any node in the model graph 404 (e.g., in such case, the program represented by that node can be considered as not satisfying/embodying any of the service domains specified in the target domain model 108). As another example, it can be the case that a node in the code graph 402 can be mapped/linked/correlated with more than one node from the model graph 404 (e.g., in such case, the program represented by that node can be considered as satisfying/embodying multiple of the service domains specified in the target domain model 108).

Figure 12:
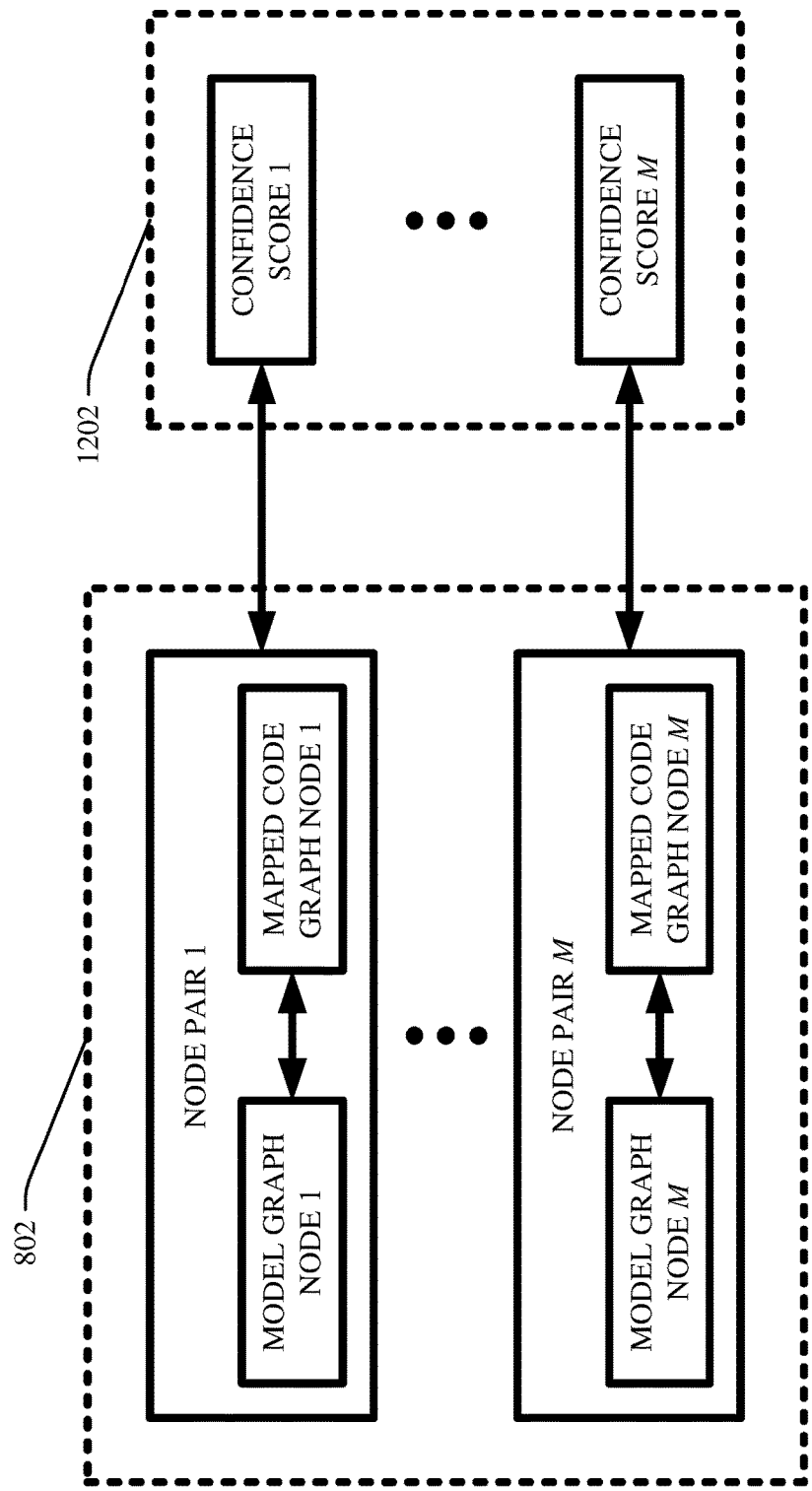

In various embodiments, the mapping component 118 can generate a confidence score for each of the set of node pairs 802. This is discussed more with respect to FIG. 12. As shown, FIG. 12 illustrates an example, non-limiting block diagram 1200 showing how confidence scores can be generated for the set of node pairs 802.

In various aspects, the mapping component 118 can generate a confidence score 1 for the node pair 1. In some instances, the confidence score 1 can be a real-valued scalar whose magnitude can indicate how similar and/or how dissimilar the model graph node 1 is to the mapped code graph node 1. Indeed, in such case, the mapping component 118 can determine the Euclidean distance separating the embedded representation of the model graph node 1 from the embedded representation of the mapped code graph node 1, and the confidence score 1 can be inversely proportional to that Euclidean distance. In other instances, the confidence score 1 can be a categorical variable generated based on a supplemental textual/semantic analysis of the source code 106 and/or of the target domain model 108. For example, in such case, the mapping component 118 can parse the target domain model 108 in search of keywords associated with the service domain represented by the model graph node 1, and the mapping component 118 can parse the source code 106 in search of a program whose comments and/or method calls utilize such keywords. If such parsing identifies the program represented by the mapped code graph node 1, then the confidence score 1 can be set to a "confident" state. On the other hand, if such parsing identifies a program other than that represented by the mapped code graph node 1, then the confidence score 1 can be set to an "unconfident" state.

Likewise, the mapping component 118 can generate a confidence score m for the node pair m. In some instances, the confidence score m can be a real-valued scalar whose magnitude can indicate how similar and/or how dissimilar the model graph node m is to the mapped code graph node m. Indeed, in such case, the mapping component 118 can determine the Euclidean distance separating the embedded representation of the model graph node m from the embedded representation of the mapped code graph node m, and the confidence score m can be inversely proportional to that Euclidean distance. In other instances, the confidence score m can be a categorical variable generated based on a supplemental textual/semantic analysis of the source code 106 and/or of the target domain model 108. Just as above, in such case, the mapping component 118 can parse the target domain model 108 in search of keywords associated with the service domain represented by the model graph node m, and the mapping component 118 can parse the source code 106 in search of a program whose comments and/or method calls utilize such keywords. If such parsing identifies the program represented by the mapped code graph node m, then the confidence score 1 can be set to a "confident" state. On the other hand, if such parsing identifies a program other than that represented by the mapped code graph node m, then the confidence score m can be set to an "unconfident" state.

Figure 13:
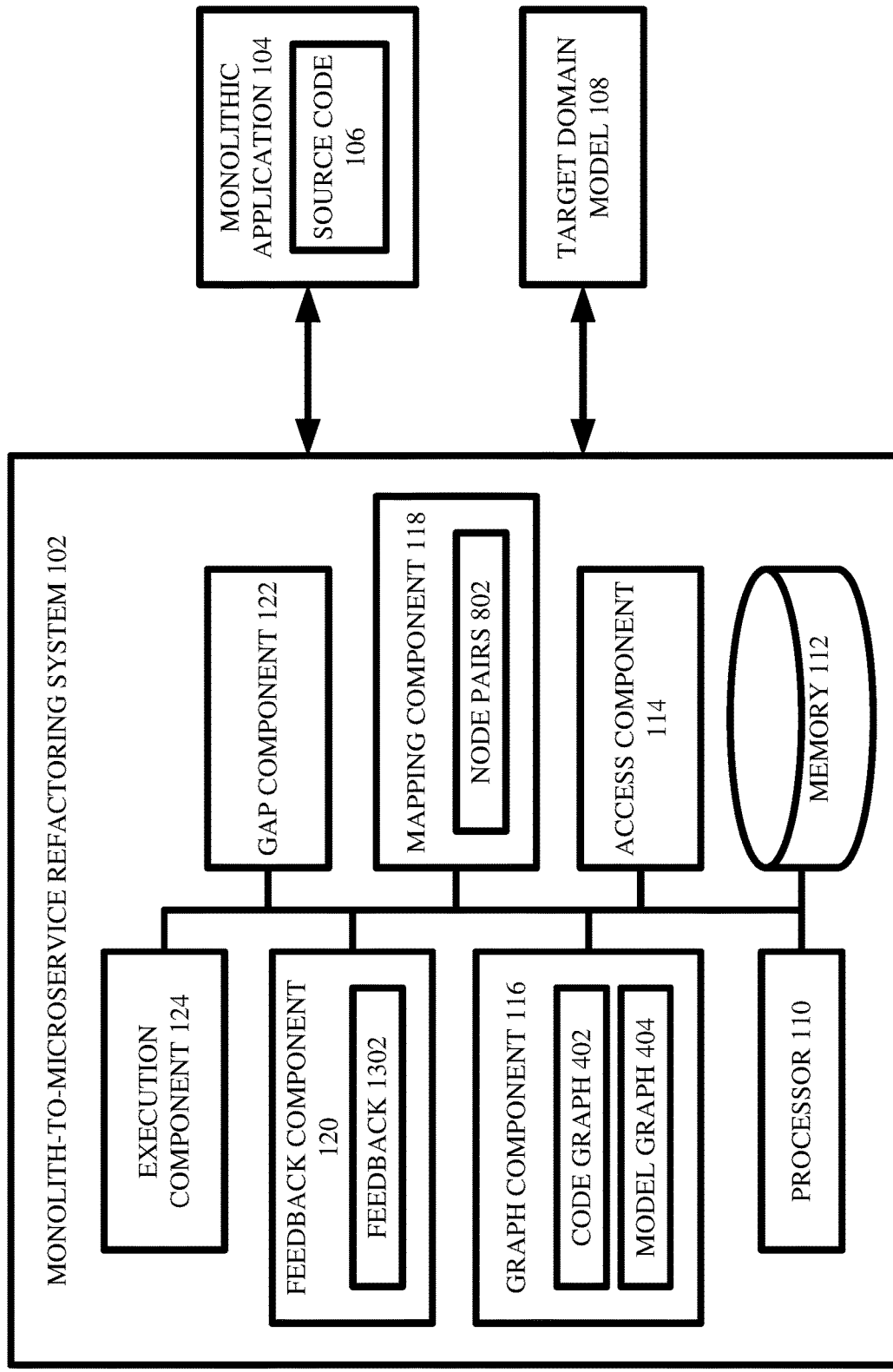
FIG. 13 illustrates a block diagram of an example, non-limiting system including feedback that facilitates monolith-to-microservice refactoring via source-code-to-domain-model graph comparison in accordance with one or more embodiments described herein.

FIG. 13 illustrates a block diagram of an example, non-limiting system 1300 including feedback that can facilitate monolith-to-microservice refactoring via source-code-to-domain-model graph comparison in accordance with one or more embodiments described herein. As shown, the system 1300 can, in some cases, comprise the same components as the system 800, and can further comprise feedback 1302.

In various embodiments, the feedback component 120 can transmit the set of node pairs 802 to any suitable computing device (not shown), and the feedback component 120 can prompt a user of that computing device to approve and/or reject any of the set of node pairs 802. In response to such prompting, the feedback component 120 can electronically receive, retrieve, and/or otherwise access, from such computing device, the feedback 1302. In various aspects, the feedback 1302 can be any suitable electronic data that approves and/or rejects any of the set of node pairs 802. In some cases, for any node pair that is rejected, the feedback 1302 can indicate an updated and/or otherwise corrected node pair. In such case, the feedback component 120 can replace, in the set of node pairs 802, the rejected node pair with the updated/corrected node pair. In some cases, the feedback component 120 can prompt the user for feedback in this fashion regarding all of the set of node pairs 802. In other cases, the feedback component 120 can prompt the user for feedback in this fashion regarding fewer than all of the set of node pairs 802 (e.g., can request feedback only for those node pairs whose scalar confidence scores fail to satisfy a threshold level and/or whose categorical confidence scores are set to the "unconfident" state).

Figure 14:
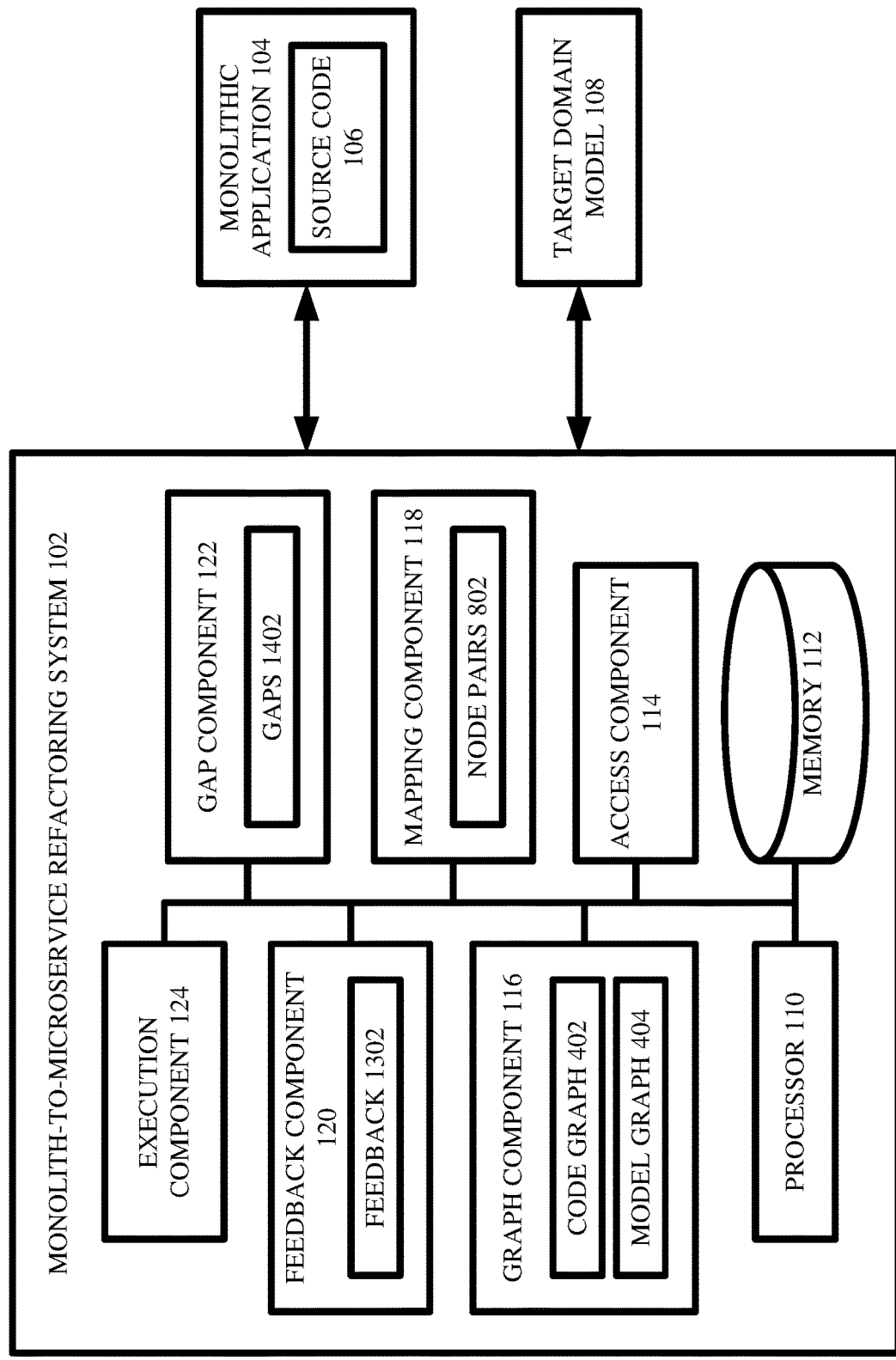
FIG. 14 illustrates a block diagram of an example, non-limiting system including a set of gaps that facilitates monolith-to-microservice refactoring via source-code-to-domain-model graph comparison in accordance with one or more embodiments described herein.

FIG. 14 illustrates a block diagram of an example, non-limiting system 1400 including a set of gaps that can facilitate monolith-to-microservice refactoring via source-code-to-domain-model graph comparison in accordance with one or more embodiments described herein. As shown, the system 1400 can, in some cases, comprise the same components as the system 1300, and can further comprise a set of gaps 1402.

In various embodiments, the gap component 122 can electronically identify and/or generate the set of gaps 1402, based on the set of node pairs 802, and/or based on a textual/semantic analysis of the source code 106 and of the target domain model 108. More specifically, for any node pair in the set of node pairs 802, the gap component 122 can identify the service domain and the program corresponding to that node pair, the gap component 122 can compare (e.g., via string searching) the business capabilities of that service domain with the non-exposing method calls of that program, and/or the gap component 122 can compare (e.g., via string searching) the service domain interactions of that service domain with the program-exposing method calls of that program. In various cases, the set of gaps 1402 can be any suitable electronic data that records/logs mismatches between such business capabilities and such non-exposing method calls, and/or between such service domain interactions and such program-exposing method calls. This is further explained with respect to FIGS. 15-16.

Figure 15:
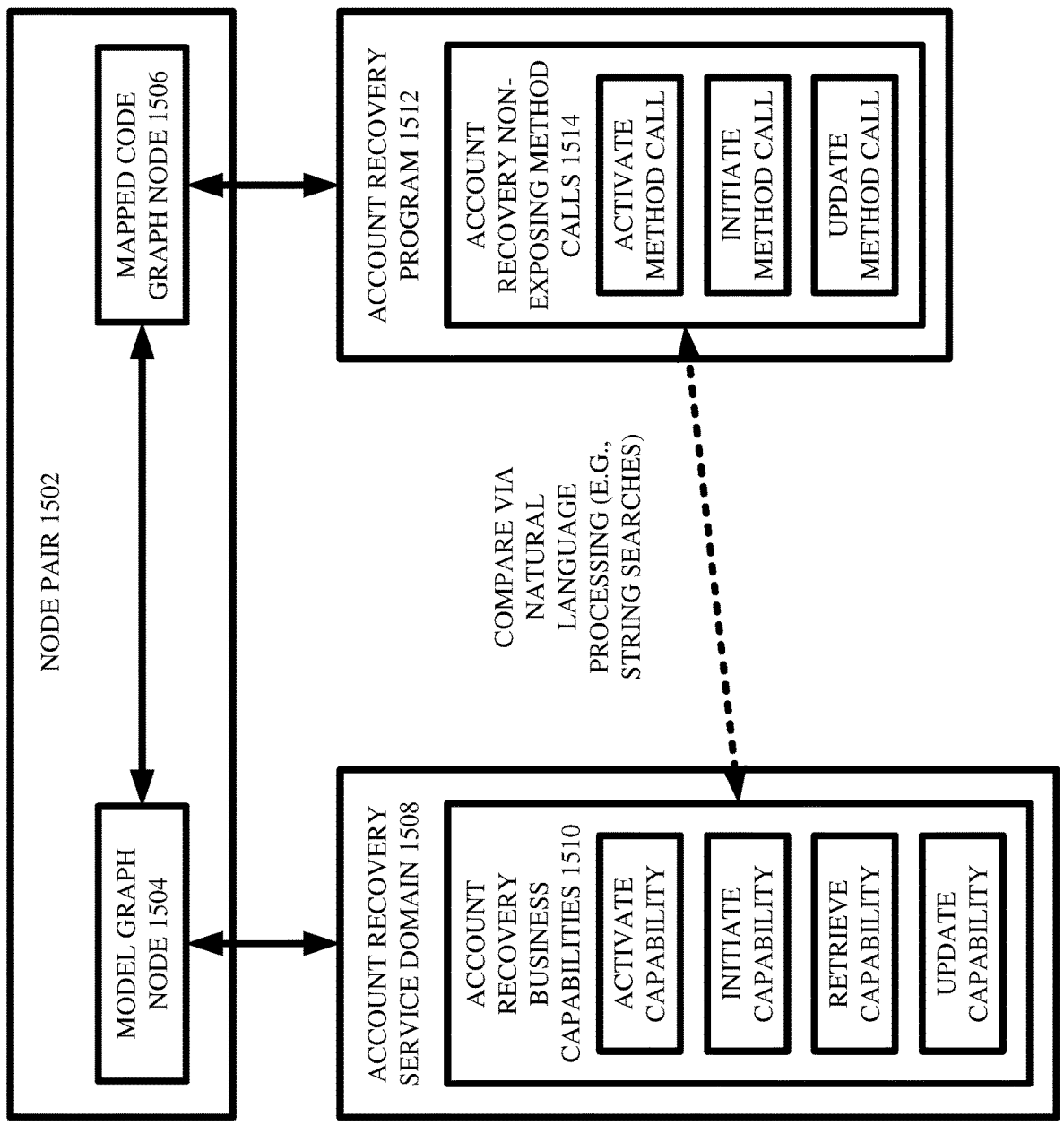
FIGS. 15-16 illustrate example, non-limiting block diagrams showing how a set of gaps can be identified based on a set of node pairs in accordance with one or more embodiments described herein.

FIG. 15 illustrates an example, non-limiting block diagram 1500 showing how gaps between business capabilities and non-exposing method calls can be identified. In various embodiments, a node pair 1502 can be any of the set of node pairs 802. As shown, the node pair 1502 can indicate that a model graph node 1504 is linked/correlated with a mapped code graph node 1506. For purposes of illustration, suppose that the model graph node 1504 represents an account recovery service domain 1508 that is specified in the target domain model 108, and further suppose that the mapped code graph node 1506 represents an account recovery program 1512 that is written within the source code 106. In various instances, the account recovery service domain 1508 can be responsible for performing a set of account recovery business capabilities 1510. As some non-limiting examples, the set of account recovery business capabilities 1510 can include an "activate" capability, an "initiate" capability, a "retrieve" capability, and/or an "update" capability. Furthermore, the account recovery program 1512 can include a set of account recovery non-exposing method calls 1514. As some non-limiting examples, the set of account recovery non-exposing method calls 1514 can include an "activate" method call, an "initiate" method call, and/or an "update" method call. In various cases, the gap component 122 can parse the set of account recovery business capabilities 1510 to identify pertinent keywords (e.g., "activate," "initiate," "retrieve", "update"), and the gap component 122 can utilize string searching and/or any other suitable natural language processing technique to search for such pertinent keywords in the account recovery non-exposing method calls 1514. If there is any pertinent keyword within the set of account recovery business capabilities 1510 that is not found within the set of account recovery non-exposing method calls 1514, then the gap component 122 can conclude that there exists a gap between the account recovery service domain 1508 and the account recovery program 1512, and the gap component 122 can record/log such gap in the set of gaps 1402. In the non-limiting example of FIG. 15, a keyword analysis/string-search can conclude that the set of account recovery non-exposing method calls 1514 fails to include a method call corresponding to the "retrieve" capability specified in the set of account recovery business capabilities 1510.

Figure 16:
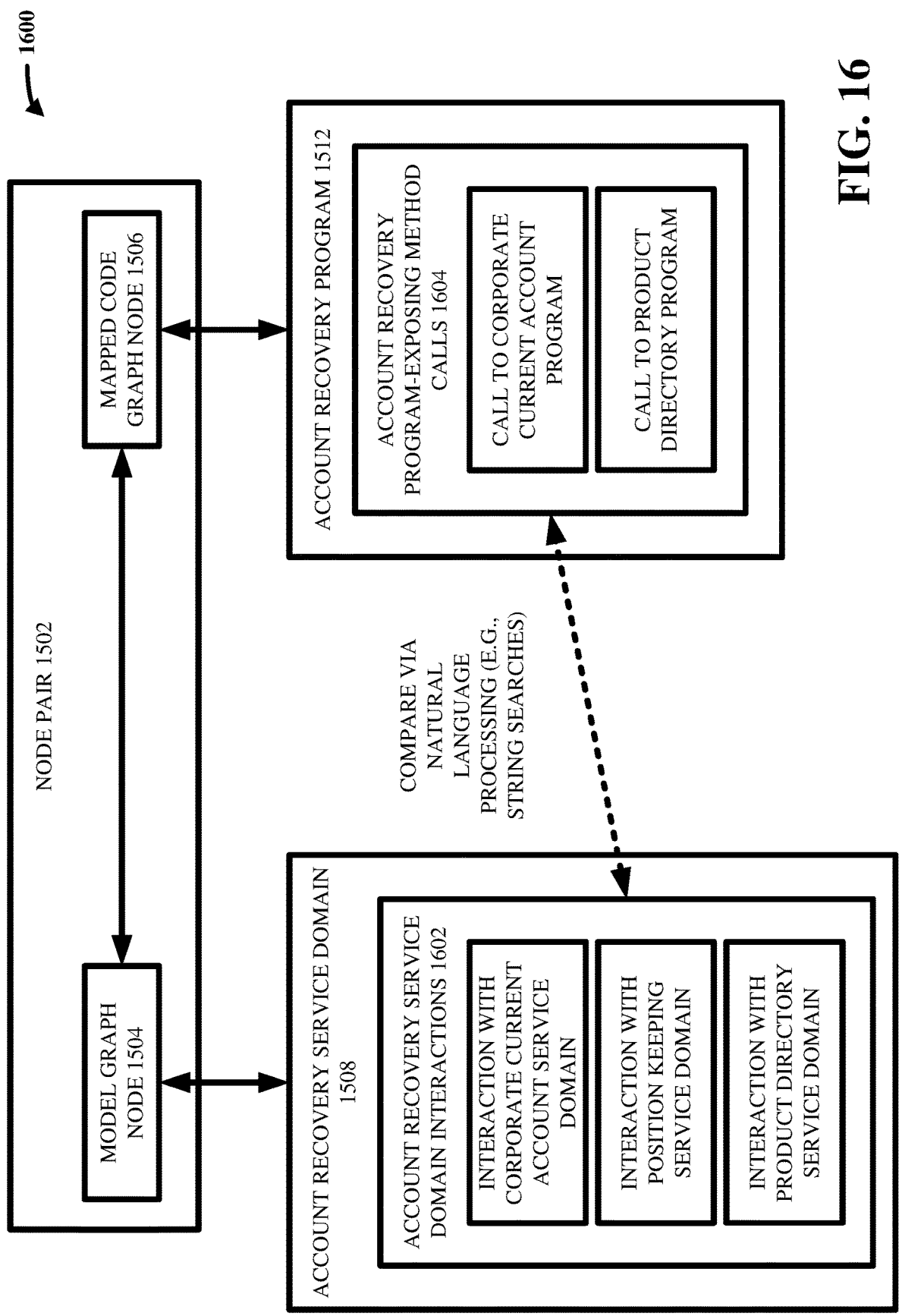

FIG. 16 illustrates an example, non-limiting block diagram 1600 showing how gaps between service domain interactions and program-exposing method calls can be identified. In various embodiments, the node pair 1502, the model graph node 1504, the mapped code graph node 1506, the account recovery service domain 1508, and the account recovery program 1512 can be as described above. In various aspects, the account recovery service domain 1508 can be desired/expected to participate in a set of account recovery service domain interactions 1602. As some non-limiting examples, the set of account recovery service domain interactions 1602 can include an interaction with a "corporate current account" service domain, an interaction with a "position keeping" service domain, and an interaction with a "product directory" service domain. Furthermore, the account recovery program 1512 can include a set of account recovery program-exposing method calls 1604. As some non-limiting examples, the set of account recovery program-exposing method calls 1604 can include an invocation of a "corporate current account" program, and an invocation of a "product directory" program. In various cases, the gap component 122 can parse the set of account recovery service domain interactions 1602 to identify pertinent keywords (e.g., "corporate current account," "position keeping," "product directory"), and the gap component 122 can utilize string searching and/or any other suitable natural language processing technique to search for such pertinent keywords in the account recovery program-exposing method calls 1604. If there is any pertinent keyword within the set of account recovery service domain interactions 1602 that is not found within the set of account recovery program-exposing method calls 1604, then the gap component 122 can conclude that there exists a gap between the account recovery service domain 1508 and the account recovery program 1512, and the gap component 122 can record/log such gap in the set of gaps 1402. In the non-limiting example of FIG. 16, a keyword analysis/string-search can conclude that the set of account recovery program-exposing method calls 1604 fails to include an invocation of a program corresponding to the "position keeping" service domain specified in the set of account recovery service domain interactions 1602.

Figure 17:
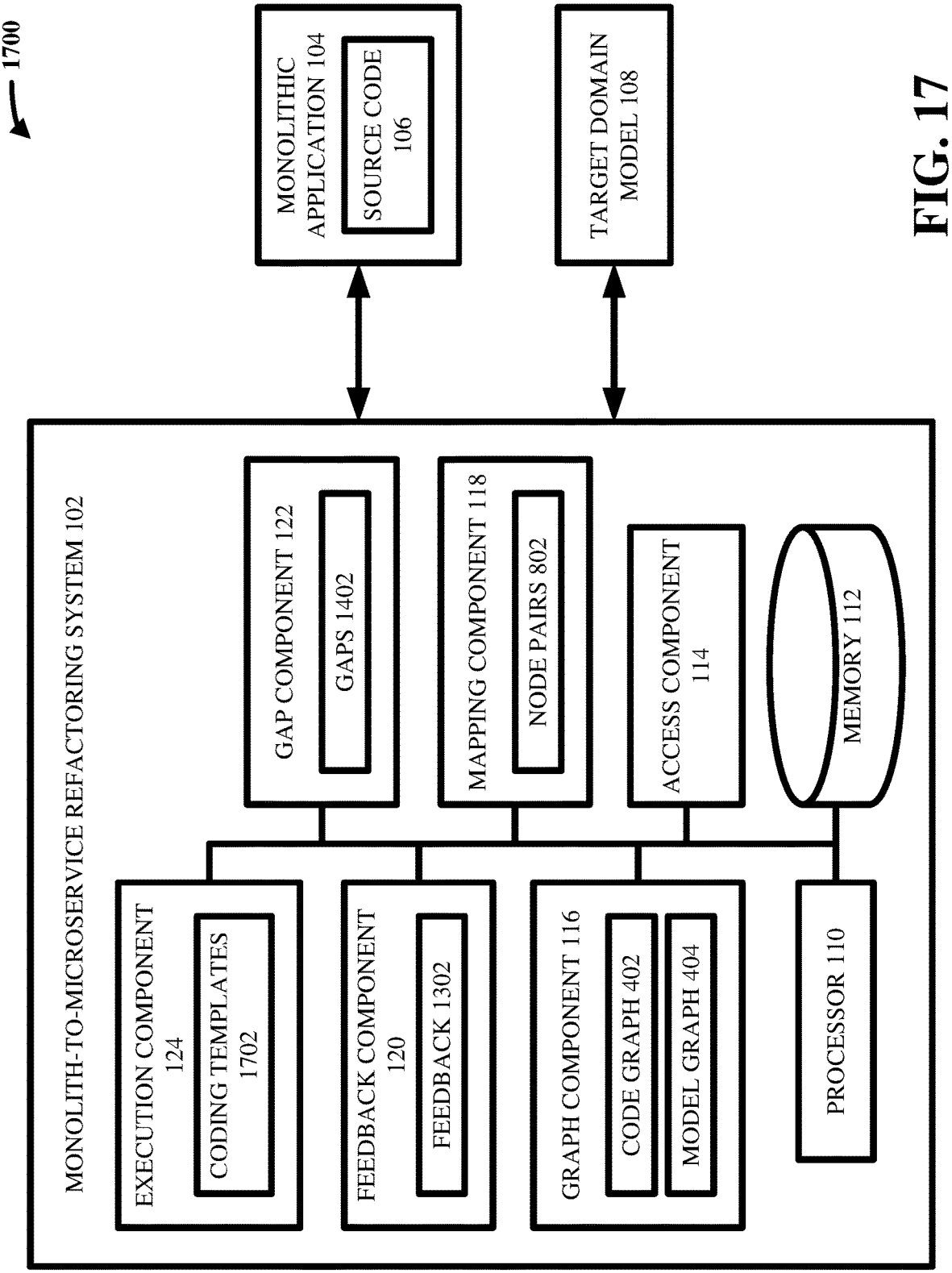
FIG. 17 illustrates a block diagram of an example, non-limiting system including a set of coding templates that facilitates monolith-to-microservice refactoring via source-code-to-domain-model graph comparison in accordance with one or more embodiments described herein.
Figure 18:
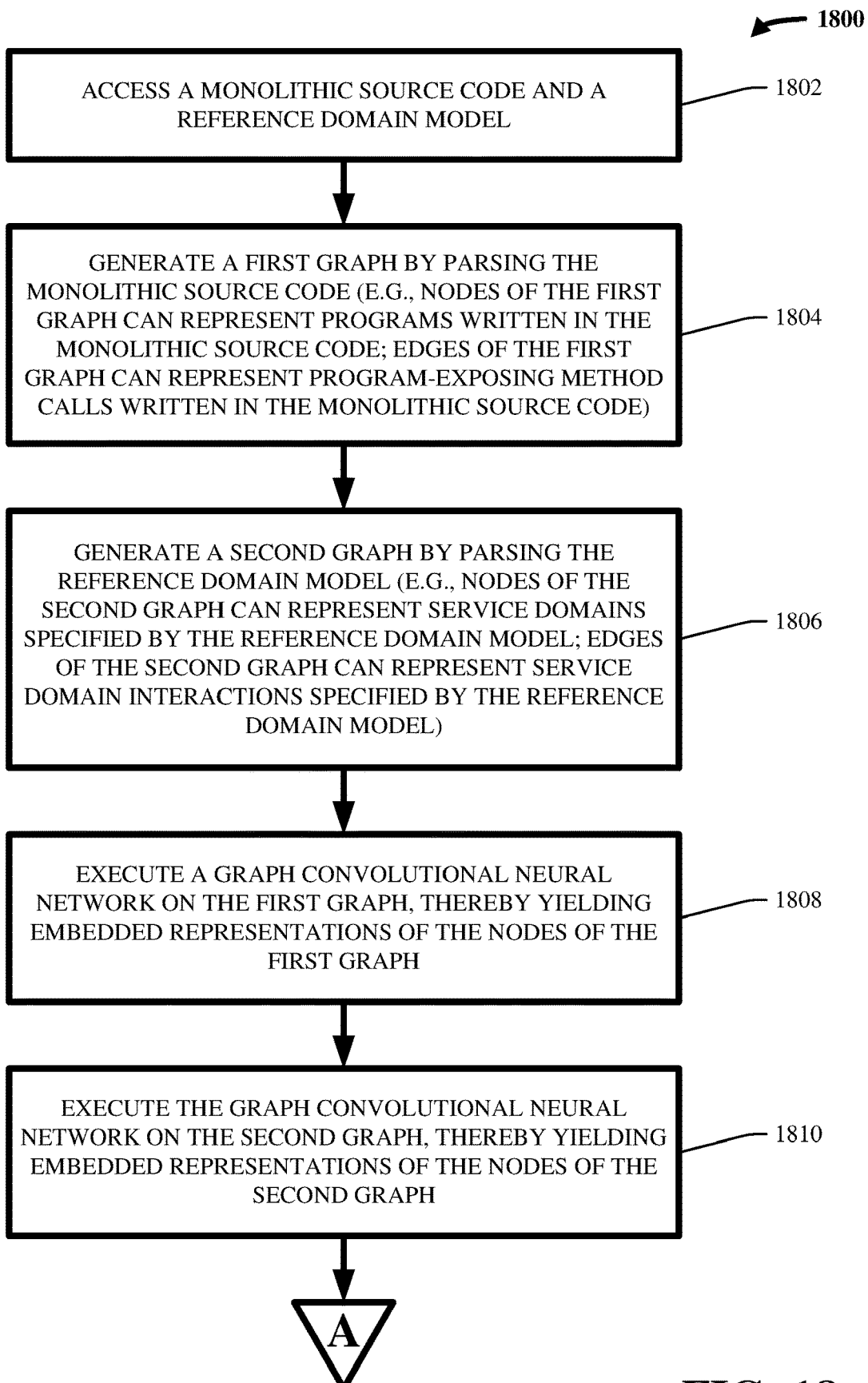
FIGS. 18-21 illustrate flow diagrams of example, non-limiting computer-implemented methods that facilitate monolith-to-microservice refactoring via source-code-to-domain-model graph comparison in accordance with one or more embodiments described herein.
Figure 19:
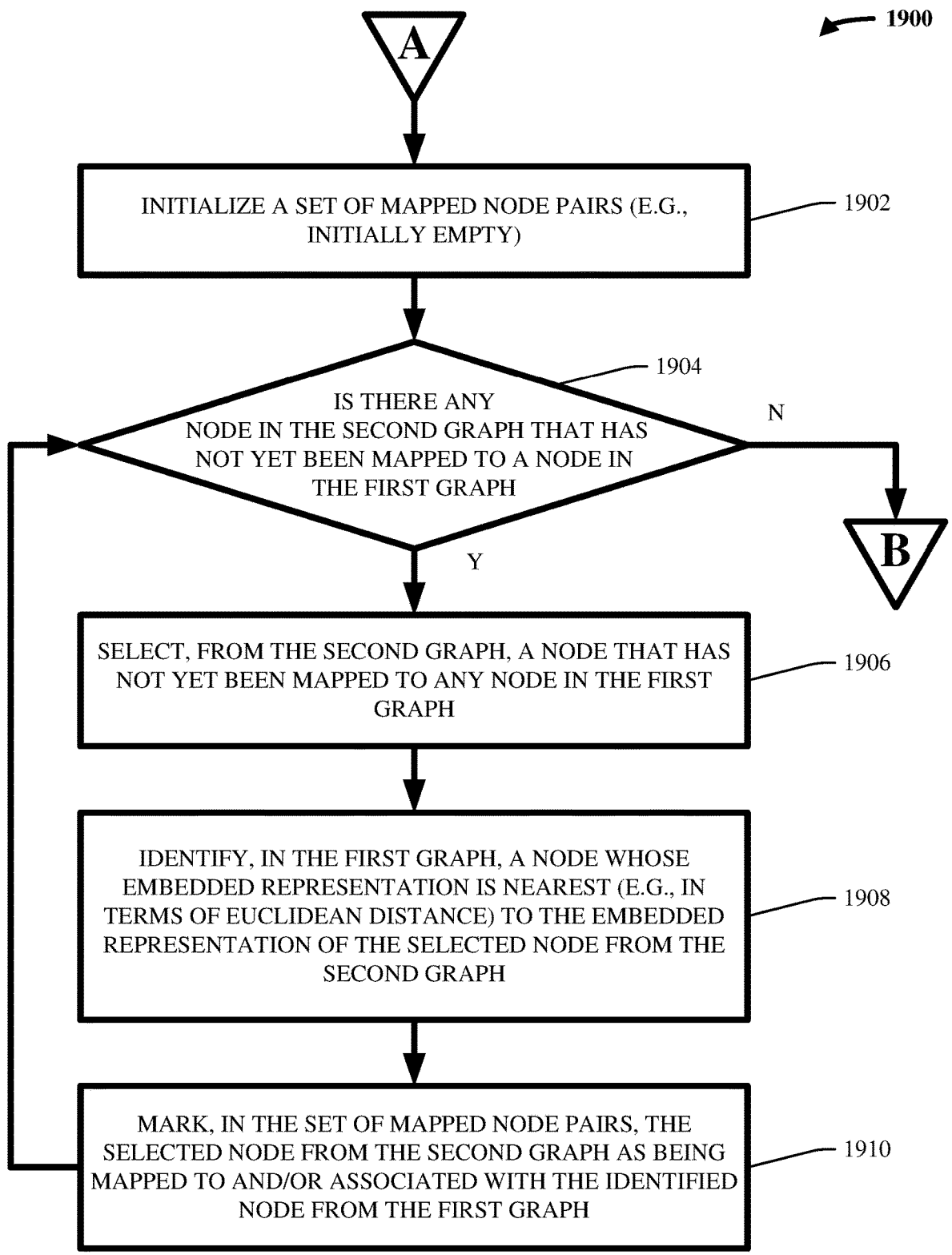
Figure 20:
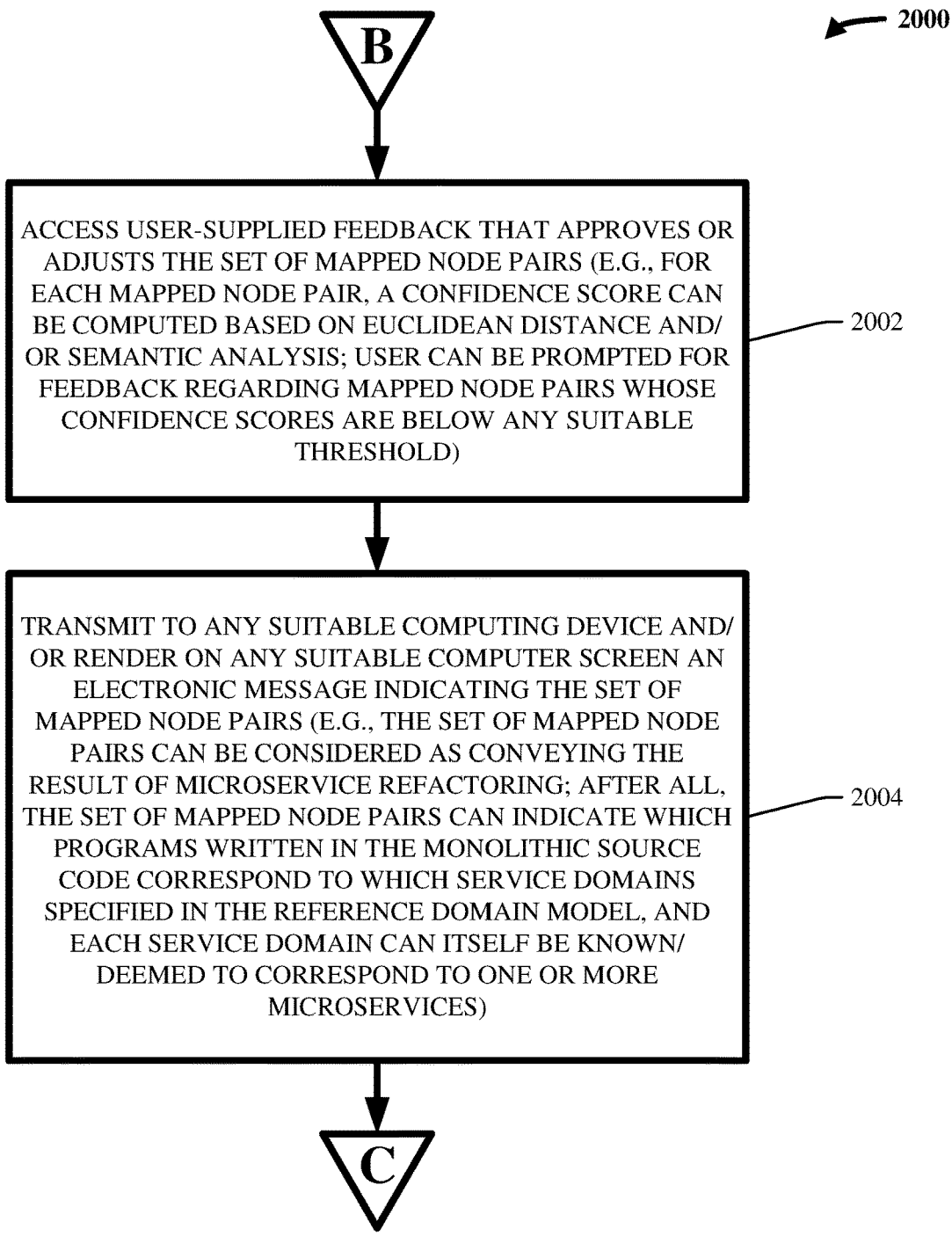
Figure 21:
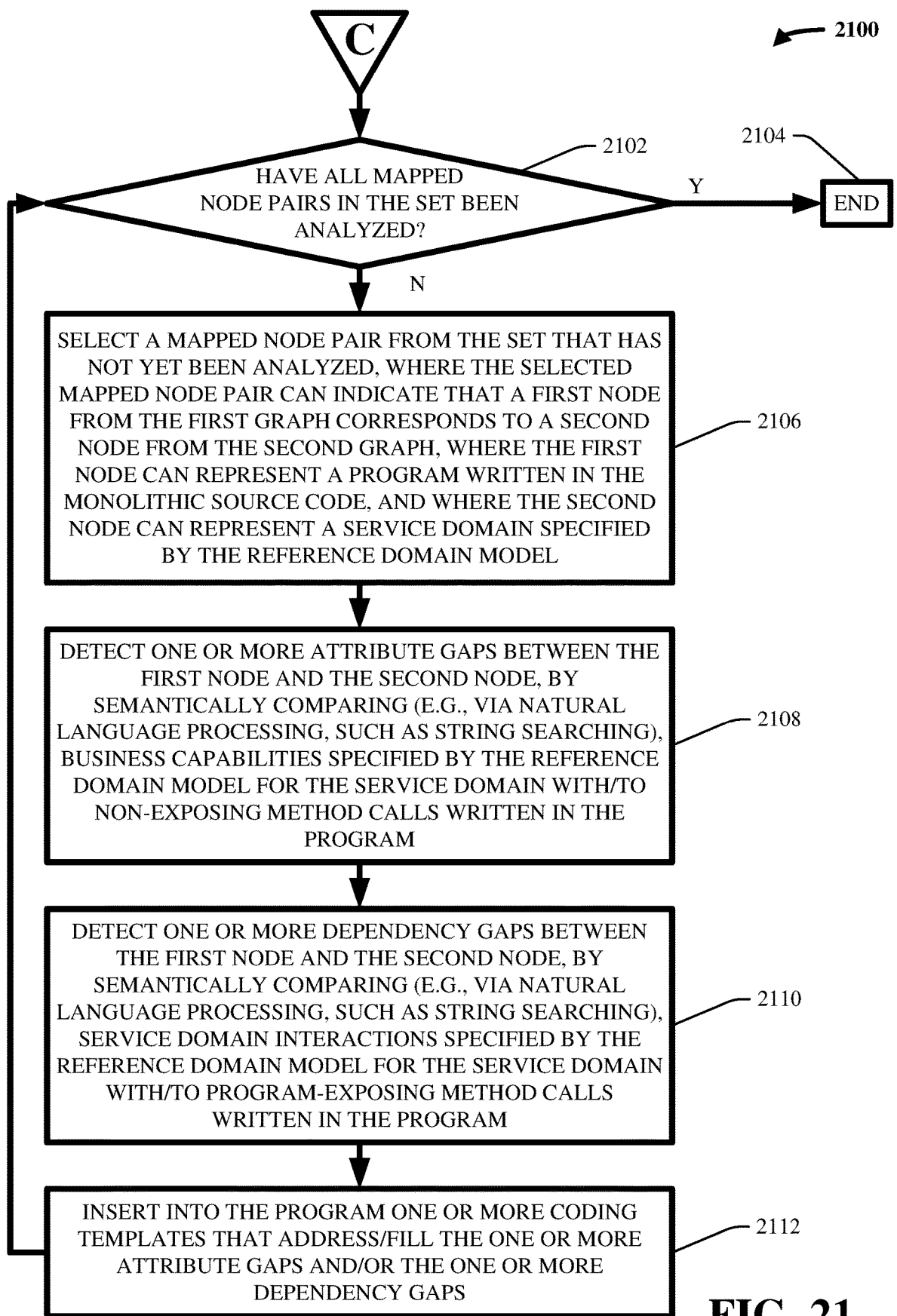

FIG. 17 illustrates a block diagram of an example, non-limiting system 1700 including a set of coding templates that can facilitate monolith-to-microservice refactoring via source-code-to-domain-model graph comparison in accordance with one or more embodiments described herein. As shown, the system 1700 can, in some cases, comprise the same components as the system 1400, and can further comprise a set of coding templates 1702.

In various embodiments, because the set of node pairs 802 can be considered as the microservice refactoring results, the execution component 124 can electronically share the set of node pairs 802 (and/or a subset thereof) so that follow-on decisions regarding microservice refactoring can be made for the monolithic application 104. For example, in some cases, the execution component 124 can transmit the set of node pairs 802 (or a subset thereof) to any suitable computing device (not shown). As another example, in some cases, the execution component 124 can render the set of node pairs 802 (or a subset thereof) on any suitable computing monitor/screen (not shown). In some instances, such transmitting and/or rendering can be considered as an electronic recommendation to refactor the monolithic application 104 according to the set of node pairs 802 (e.g., as an electronic recommendation to replace/substitute programs of the source code 106 with known microservices, based on which programs of the source code 106 correspond to which service domains specified by the target domain model 108). Furthermore, in some cases, the execution component 124 can likewise transmit to any suitable computing device and/or render on any suitable computer display/monitor the set of gaps 1402 (or a subset thereof), so as to notify a user of any identified mismatches between the source code 106 and the target domain model 108.

Further still, in various aspects, the execution component 124 can electronically store, maintain, and/or otherwise access the set of coding templates 1702, and the execution component 124 can selectively insert any of the set of coding templates 1702 into the source code 106, so as to fill and/or otherwise address the set of gaps 1402. In other words, the set of coding templates 1702 can be any suitable sequences of pre-written and/or pre-categorized computer-executable instructions (e.g., can be pre-written non-exposing method calls, can be pre-written program-exposing method calls). In various aspects, the execution component 124 can electronically identify (e.g., via keyword matching) which of the set of coding templates 1702 would address and/or fill the set of gaps 1402, and the execution component 124 can electronically insert such identified coding templates into the source code 106. In this way, the execution component 124 can help to ameliorate the set of gaps 1402 (e.g., can help to ameliorate the mismatches that have been identified between the source code 106 and the target domain model 108).

FIGS. 18-21 illustrate flow diagrams of example, non-limiting computer-implemented methods 1800, 1900, 2000, and 2100 that can facilitate monolith-to-microservice refactoring via source-code-to-domain-model graph comparison in accordance with one or more embodiments described herein. In various cases, the refactoring system 102 can facilitate the computer-implemented methods 1800-2100.

In various embodiments, act 1802 can include accessing, by a device (e.g., 114) operatively coupled to a processor, a monolithic source code (e.g., 106) and a reference domain model (e.g., 108).

In various aspects, act 1804 can include generating, by the device (e.g., via 116), a first graph (e.g., 402) by parsing the monolithic source code. In various cases, nodes of the first graph can represent programs written in the monolithic source code, and edges of the first graph can represent program-exposing method calls written in the monolithic source code.

In various instances, act 1806 can include generating, by the device (e.g., via 116), a second graph (e.g., 404) by parsing the reference domain model. In various cases, nodes of the second graph can represent service domain specified by the reference domain model, and edges of the second graph can represent service domain interactions specified by the reference domain model.

In various aspects, act 1808 can include executing, by the device (e.g., via 118), a graph convolutional neural network (e.g., 902) on the first graph, thereby yielding embedded representations (e.g., 904) of the nodes of the first graph.

In various instances, act 1810 can include executing, by the device (e.g., via 118), the graph convolutional neural network on the second graph, thereby yielding embedded representations (e.g., 1002) of the nodes of the second graph. As shown, the computer-implemented method 1800 can then proceed to act 1902 of the computer-implemented method 1900.

In various embodiments, act 1902 can include initializing, by the device (e.g., via 118), a set of mapped node pairs (e.g., 802). This set can be initially empty.

In various aspects, act 1904 can include determining, by the device (e.g., via 118), whether there is any node in the second graph that has not yet been mapped to a node in the first graph. If not, the computer-implemented method 1900 can proceed to act 2002 of the computer-implemented method 2000. If so, the computer-implemented method 1900 can instead proceed to act 1906.

In various instances, act 1906 can include selecting, by the device (e.g., via 118) and from the second graph, a node that has not yet been mapped to any node in the first graph.

In various cases, act 1908 can include identifying, by the device (e.g., via 118) and in the first graph, a node whose embedded representation is nearest (e.g., in terms of Euclidean distance) to the embedded representation of the selected node from the second graph.

In various aspects, act 1910 can include marking, by the device (e.g., via 118) and in the set of mapped node pairs, the selected node from the second graph as being mapped to and/or associated with the identified node from the first graph. In various cases, the computer-implemented method 1900 can proceed back to act 1904.

In various embodiments, act 2002 can include accessing, by the device (e.g., via 120), user-supplied feedback (e.g., 1302) that approves or adjusts the set of mapped node pairs. In various cases, for each mapped node pair, a confidence score (e.g., one of 1202) can be computed based on Euclidean distance and/or semantic/keyword analysis, and a user can be prompted for feedback regarding those mapped node pairs whose confidence scores are below any suitable threshold level.

In various aspects, act 2004 can include transmitting, by the device (e.g., via 124), to any suitable computing device and/or rendering, by the device (e.g., via 124), on any suitable computer screen an electronic message indicating the set of mapped node pairs (e.g., indicating those mapped node pairs that have been approved by the user-provided feedback). In various cases, the set of mapped node pairs can be considered as conveying the result of microservice refactoring (e.g., can be considered as indicating which programs written in the monolithic source code correspond to which service domains specified in the reference domain model, where each service domain can be known/deemed to correspond to one or more microservices). As shown, the computer-implemented method 2000 can proceed to act 2102 of the computer-implemented method 2100.

In various embodiments, act 2102 can include determining, by the device (e.g., via 122), whether all mapped node pairs in the set have been analyzed. If so, the computer-implemented method 2100 can end at act 2104. If not, the computer-implemented method 2100 can instead proceed to act 2106.

In various aspects, act 2106 can include selecting, by the device (e.g., via 122) a mapped node pair (e.g., 1502) from the set that has not yet been analyzed, where the mapped node pair can indicate that a first node (e.g., 1506) from the first graph corresponds to a second node (e.g., 1504) from the second graph, where the first node can represent a program (e.g., 1512) written in the monolithic source code, and/or where the second node can represent a service domain (e.g., 1508) specified by the reference domain model.

In various instances, act 2108 can include detecting, by the device (e.g., via 122), one or more attribute gaps (e.g., some of 1402) between the first node and the second node, by semantically comparing business capabilities (e.g., 1510) specified by the reference domain model for the service domain with/to non-exposing method calls (e.g., 1514) written in the program.

In various aspects, act 2110 can include detecting, by the device (e.g., via 122), one or more dependency gaps (e.g., others of 1402) between the first node and the second node, by semantically comparing service domain interactions (e.g., 1602) specified by the reference domain model for the service domain with/to program-exposing method calls (e.g., 1604) written in the program.

In various instances, act 2112 can include inserting, by the device (e.g., via 124), into the program one or more coding templates (e.g., 1702) that can address/fill the one or more attribute gaps and/or the one or more dependency gaps. In various cases, the computer-implemented method 2100 can proceed back to act 2102.

Figure 22:
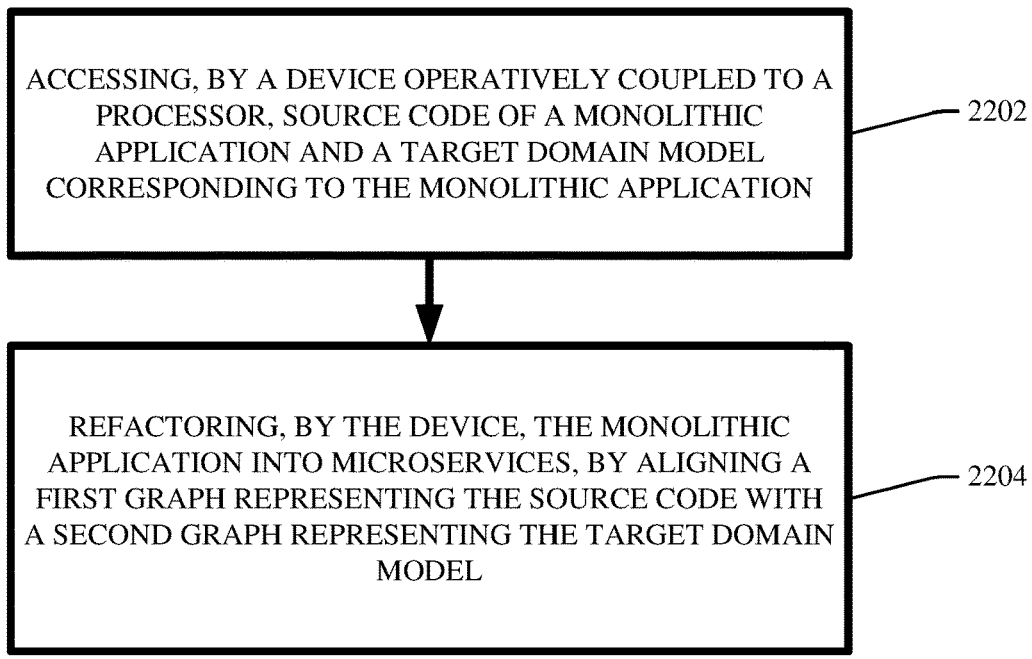
FIG. 22 illustrates a flow diagram of an example, non-limiting computer-implemented method that facilitates monolith-to-microservice refactoring via source-code-to-domain-model graph comparison in accordance with one or more embodiments described herein.

FIG. 22 illustrates a flow diagram of an example, non-limiting computer-implemented method 2200 that can facilitate monolith-to-microservice refactoring via source-code-to-domain-model graph comparison in accordance with one or more embodiments described herein. In various cases, the refactoring system 102 can facilitate the computer-implemented method 2200.

In various embodiments, act 2202 can include accessing, by a device (e.g., via 114) operatively coupled to a processor, source code (e.g., 106) of a monolithic application (e.g., 104) and a target domain model (e.g., 108) corresponding to the monolithic application.

In various aspects, act 2204 can include refactoring, by the device (e.g., via 118), the monolithic application into microservices, by aligning a first graph (e.g., 402) representing the source code with a second graph (e.g., 404) representing the target domain model.

Although not explicitly shown in FIG. 22, the computer-implemented method 2200 can further include: generating, by the device (e.g., via 116), the first graph by parsing the source code in search of programs (e.g., 202) and program-exposing method calls, wherein nodes (e.g., 502) of the first graph respectively represent the programs, and wherein edges (e.g., 504) of the first graph respectively represent the program-exposing method calls; and generating, by the device (e.g., via 116), the second graph by parsing the target domain model in search of service domains (e.g., 302) and service domain interactions (e.g., 304), wherein nodes (e.g., 506) of the second graph respectively represent the service domains, and wherein edges (e.g., 508) of the second graph respectively represent the service domain interactions.

Although not shown in FIG. 22, the aligning the first graph with the second graph can yield a set of node pairs (e.g., 802) that respectively map nodes of the first graph to nodes of the second graph, wherein the nodes of the second graph respectively correspond to the microservices.

Those having ordinary skill in the art will appreciate that the herein disclosure describes non-limiting examples of various embodiments. For ease of description and/or explanation, various portions of the herein disclosure utilize the term "each" when discussing various embodiments. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments, and it should be further understood that, in various other embodiments, it can be the case that such description applies to fewer than "each" of that particular object and/or component.

Figure 23:
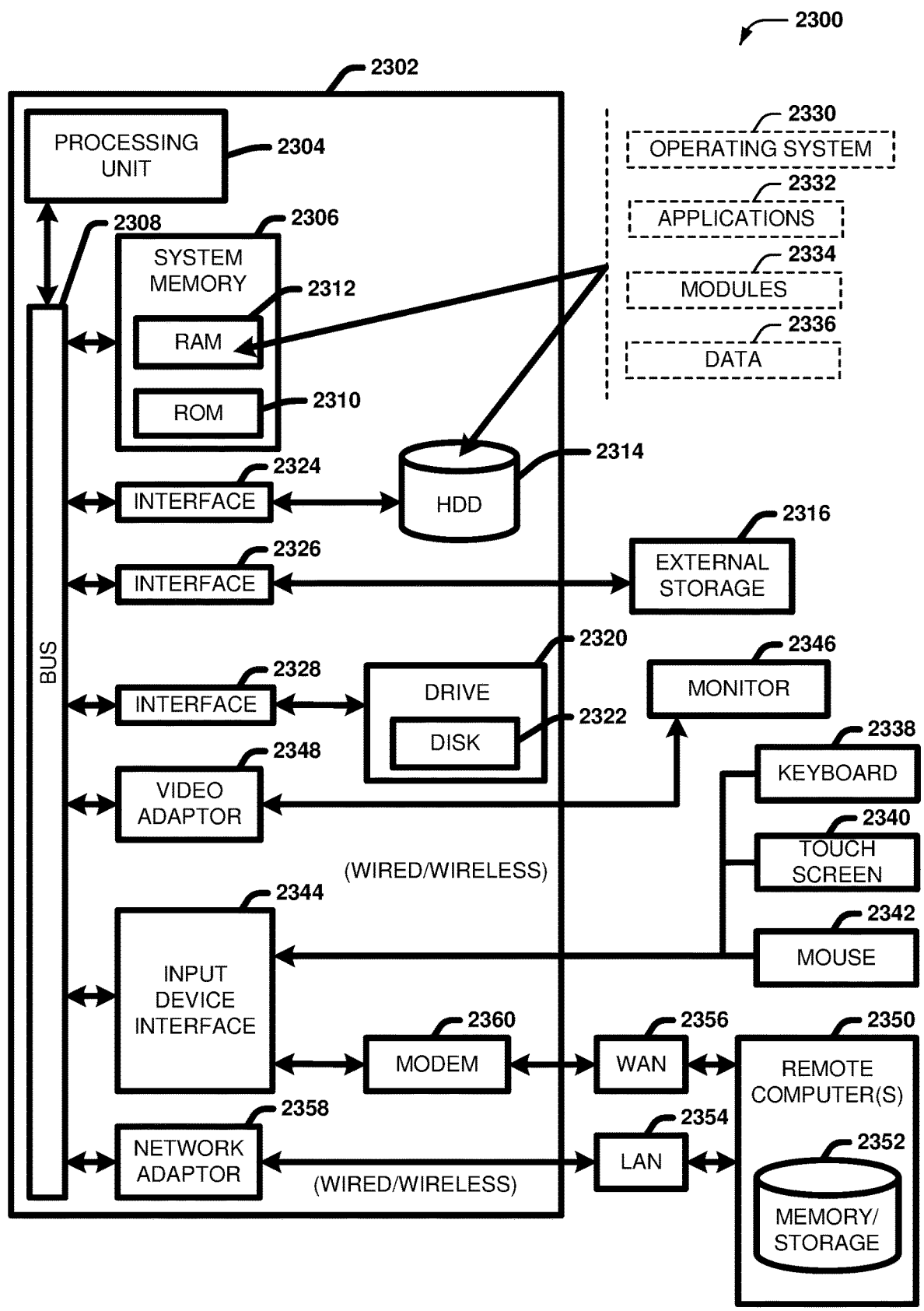
FIG. 23 illustrates a block diagram of an example, non-limiting operating environment in which one or more embodiments described herein can be facilitated.

In order to provide additional context for various embodiments described herein, FIG. 23 and the following discussion are intended to provide a brief, general description of a suitable computing environment 2300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23, the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), one or more external storage devices 2316 (e.g., a magnetic floppy disk drive (FDD) 2316, a memory stick or flash drive reader, a memory card reader, etc.) and a drive 2320, e.g., such as a solid state drive, an optical disk drive, which can read or write from a disk 2322, such as a CD-ROM disc, a DVD, a BD, etc. Alternatively, where a solid state drive is involved, disk 2322 would not be included, unless separate. While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314. The HDD 2314, external storage device(s) 2316 and drive 2320 can be connected to the system bus 2308 by an HDD interface 2324, an external storage interface 2326 and a drive interface 2328, respectively. The interface 2324 for external drive implementations can include at least one or both of Universal Serial Bus (USB) and Institute of Electrical and Electronics Engineers (IEEE)

1394 interface technologies. Other external drive connection technologies are within contemplation of the embodiments described herein.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for applications 2332. Runtime environments are consistent execution environments that allow applications 2332 to run on any operating system that includes the runtime environment. Similarly, operating system 2330 can support containers, and applications 2332 can be in the form of containers, which are lightweight, standalone, executable packages of software that include, e.g., code, runtime, system tools, system libraries and settings for an application.

Further, computer 2302 can be enable with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a USB port, an IR interface, a BLUETOOTH® interface, etc.

A monitor 2346 or other type of display device can be also connected to the system bus 2308 via an interface, such as a video adapter 2348. In addition to the monitor 2346, a computer typically includes other peripheral output devices (not shown), such as speakers, printers, etc.

The computer 2302 can operate in a networked environment using logical connections via wired and/or wireless communications to one or more remote computers, such as a remote computer(s) 2350. The remote computer(s) 2350 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2352 is illustrated. The logical connections depicted include wired/wireless connectivity to a local area network (LAN) 2354 and/or larger networks, e.g., a wide area network (WAN) 2356. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2354 through a wired and/or wireless communication network interface or adapter 2358. The adapter 2358 can facilitate wired or wireless communication to the LAN 2354, which can also include a wireless access point (AP) disposed thereon for communicating with the adapter 2358 in a wireless mode.

When used in a WAN networking environment, the computer 2302 can include a modem 2360 or can be connected to a communications server on the WAN 2356 via other means for establishing communications over the WAN 2356, such as by way of the Internet. The modem 2360, which can be internal or external and a wired or wireless device, can be connected to the system bus 2308 via the input device interface 2344. In a networked environment, program modules depicted relative to the computer 2302 or portions thereof, can be stored in the remote memory/storage device 2352. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above, such as but not limited to a network virtual machine providing one or more aspects of storage or processing of information. Generally, a connection between the computer 2302 and a cloud storage system can be established over a LAN 2354 or WAN 2356 e.g., by the adapter 2358 or modem 2360, respectively. Upon connecting the computer 2302 to an associated cloud storage system, the external storage interface 2326 can, with the aid of the adapter 2358 and/or modem 2360, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 24:
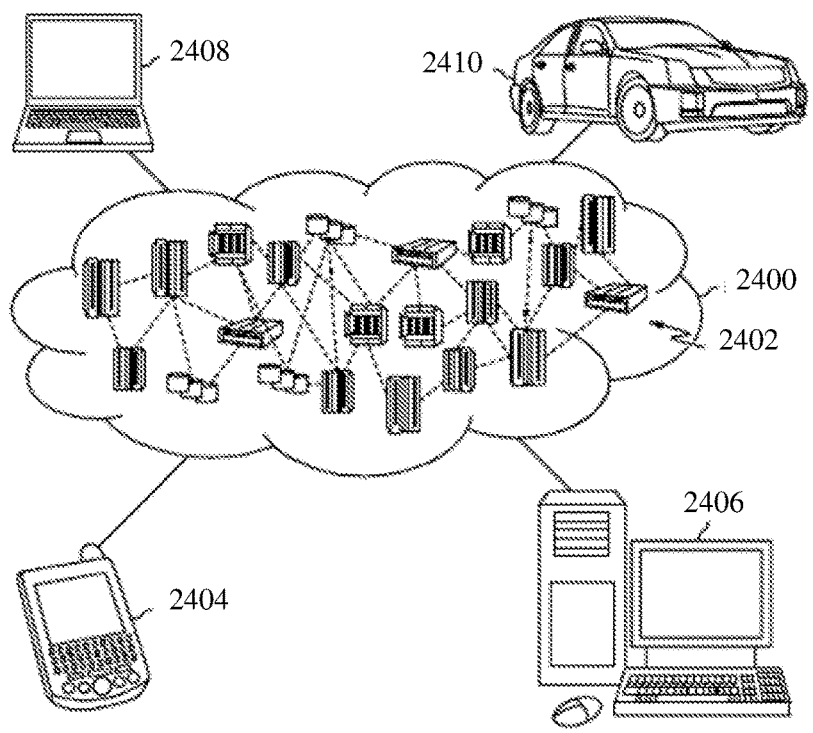
FIG. 24 illustrates an example, non-limiting cloud computing environment in accordance with one or more embodiments described herein.

Referring now to FIG. 24, illustrative cloud computing environment 2400 is depicted. As shown, cloud computing environment 2400 includes one or more cloud computing nodes 2402 with which local computing devices used by cloud consumers, such as, for example, personal digital assistant (PDA) or cellular telephone 2404, desktop computer 2406, laptop computer 2408, and/or automobile computer system 2410 may communicate. Nodes 2402 may communicate with one another. They may be grouped (not shown) physically or virtually, in one or more networks, such as Private, Community, Public, or Hybrid clouds as described hereinabove, or a combination thereof. This allows cloud computing environment 2400 to offer infrastructure, platforms and/or software as services for which a cloud consumer does not need to maintain resources on a local computing device. It is understood that the types of computing devices 2404-2410 shown in FIG. 24 are intended to be illustrative only and that computing nodes 2402 and cloud computing environment 2400 can communicate with any type of computerized device over any type of network and/or network addressable connection (e.g., using a web browser).

Figure 25:
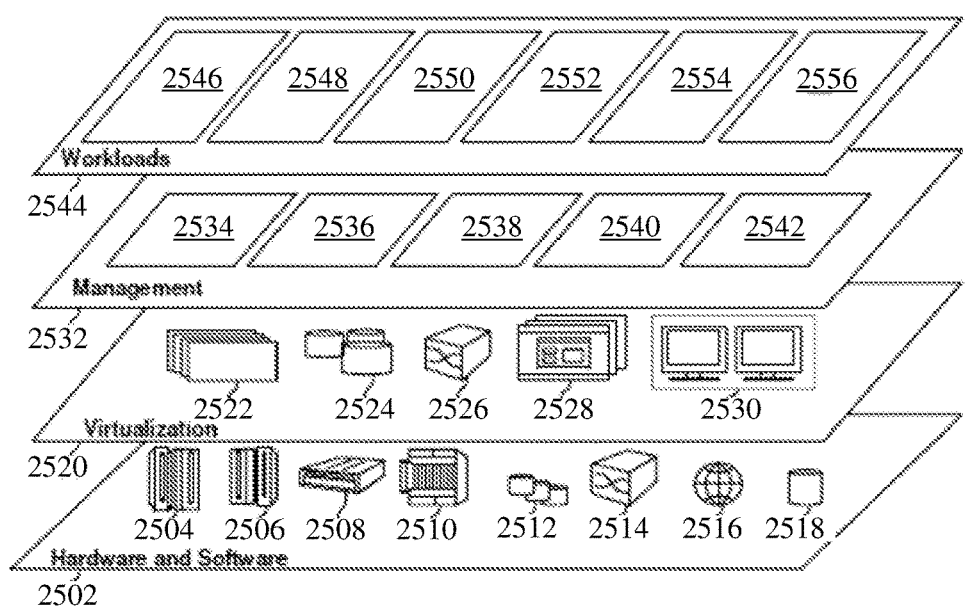
FIG. 25 illustrates example, non-limiting abstraction model layers in accordance with one or more embodiments described herein.

Referring now to FIG. 25, a set of functional abstraction layers provided by cloud computing environment 2400 (FIG. 24) is shown. Repetitive description of like elements employed in other embodiments described herein is omitted for sake of brevity. It should be understood in advance that the components, layers, and functions shown in FIG. 25 are intended to be illustrative only and embodiments described herein are not limited thereto. As depicted, the following layers and corresponding functions are provided.

Hardware and software layer 2502 includes hardware and software components. Examples of hardware components include: mainframes 2504; RISC (Reduced Instruction Set Computer) architecture based servers 2506; servers 2508; blade servers 2510; storage devices 2512; and networks and networking components 2514. In some embodiments, software components include network application server software 2516 and database software 2518.

Virtualization layer 2520 provides an abstraction layer from which the following examples of virtual entities may be provided: virtual servers 2522; virtual storage 2524; virtual networks 2526, including virtual private networks; virtual applications and operating systems 2528; and virtual clients 2530.

In one example, management layer 2532 may provide the functions described below. Resource provisioning 2534 provides dynamic procurement of computing resources and other resources that are utilized to perform tasks within the cloud computing environment. Metering and Pricing 2536 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2538 provides access to the cloud computing environment for consumers and system administrators. Service level management 2540 provides cloud computing resource allocation and management such that required service levels are met. Service Level Agreement (SLA) planning and fulfillment 2542 provide pre-arrangement for, and procurement of, cloud computing resources for which a future requirement is anticipated in accordance with an SLA.

Workloads layer 2544 provides examples of functionality for which the cloud computing environment may be utilized. Examples of workloads and functions which may be provided from this layer include: mapping and navigation 2546; software development and lifecycle management 2548; virtual classroom education delivery 2550; data analytics processing 2552; transaction processing 2554; and differentially private federated learning processing 2556. Various embodiments described herein can utilize the cloud computing environment described with reference to FIGS. 24 and 25 to execute one or more differentially private federated learning process in accordance with various embodiments described herein.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
  a memory that stores computer-executable components; and a processor that executes at least one of the computer-executable components that:
  trains a neural network to refactor monolithic applications into microservices according to target domain models;
  accesses, using the neural network, source code of a monolithic application and a target domain model corresponding to the monolithic application; and
  generates, using the neural network, a group of microservices associated with the target domain model based on refactoring the monolithic application, by aligning a first graph representing the source code with a second graph representing the target domain model, wherein the aligning the first graph with the second graph yields a set of node pairs that respectively map nodes of the first graph to nodes of the second graph, wherein the nodes of the second graph respectively correspond to the group of microservices, wherein the set of node pairs indicate that a first node of the first graph is mapped to a second node of the second graph, wherein the first node represents a program within the source code, wherein the second node represents a service domain within the target domain model, and wherein the refactoring further comprises:
    comparing, via natural language processing, non-exposing method calls written within the program to business capabilities specified by the target domain model for the service domain, and
    comparing, via the natural language processing, program-exposing method calls written within the program to service domain interactions specified by the target domain model for the service domain.

2. The system of claim 1, wherein the at least one of the computer-executable components further trains the neural network to:
  generate the first graph by parsing the source code in search of programs and the program-exposing method calls, wherein the nodes of the first graph respectively represent the programs, and wherein edges of the first graph respectively represent the program-exposing method calls; and
  generate the second graph by parsing the target domain model in search of service domains and the service domain interactions, wherein the nodes of the second graph respectively represent the service domains, and wherein edges of the second graph respectively represent the service domain interactions.

3. The system of claim 2, wherein the service domains are described by a swagger portion of the target domain model, and wherein the service domain interactions are described by a transaction flow portion of the target domain model.

4. The system of claim 1, wherein the at least one of the computer-executable components further aligns the first graph with the second graph based on Euclidean distances that respectively separate embedded node-wise representations of the first graph from embedded node-wise representations of the second graph.

5. The system of claim 1, wherein the at least one of the computer-executable components further:
  accesses user-provided feedback, wherein the user-provided feedback accepts or rejects at least one of the set of node pairs.

6. The system of claim 1, wherein the refactoring further comprises:—determining that there is a gap between the non-exposing method calls and the business capabilities or between the program-exposing method calls and the service domain interactions, and inserting, into the program, a coding template that addresses the gap.

7. The system of claim 1, wherein the aligning the first graph and the second graph comprise converting the first graph and the second graph into representations in a common embedding space.

8. A computer-implemented method, comprising:
  training, by a system operatively coupled to a processor, a neural network to refactor monolithic applications into microservices according to target domain models;
  accessing, by the system, using the neural network, source code of a monolithic application and a target domain model corresponding to the monolithic application; and
  generating, by the system, using the neural network, a group of microservices associated with the target domain model based on refactoring the monolithic application, by aligning a first graph representing the source code with a second graph representing the target domain model, wherein the aligning the first graph with the second graph yields a set of node pairs that respectively map nodes of the first graph to nodes of the second graph, wherein the nodes of the second graph respectively correspond to the group of microservices, wherein the set of node pairs indicate that a first node of the first graph is mapped to a second node of the second graph, wherein the first node represents a program within the source code, wherein the second node represents a service domain within the target domain model, and wherein the refactoring further comprises:
    comparing, via natural language processing, non-exposing method calls written within the program to business capabilities specified by the target domain model for the service domain, and
    comparing, via the natural language processing, program-exposing method calls written within the program to service domain interactions specified by the target domain model for the service domain.

9. The computer-implemented method of claim 8, further comprising training the neural network to:
  generate the first graph by parsing the source code in search of programs and the program-exposing method calls, wherein the nodes of the first graph respectively represent the programs, and wherein edges of the first graph respectively represent the program-exposing method calls; and
  generate the second graph by parsing the target domain model in search of service domains and the service domain interactions, wherein the nodes of the second graph respectively represent the service domains, and wherein edges of the second graph respectively represent the service domain interactions.

10. The computer-implemented method of claim 9, wherein the service domains are described by a swagger portion of the target domain model, and wherein the service domain interactions are described by a transaction flow portion of the target domain model.

11. The computer-implemented method of claim 8, wherein the aligning the first graph with the second graph is based on Euclidean distances that respectively separate embedded node-wise representations of the first graph from embedded node-wise representations of the second graph.

12. The computer-implemented method of claim 8, further comprising:
  accessing, by the system, user-provided feedback, wherein the user-provided feedback accepts or rejects at least one of the set of node pairs.

13. The computer-implemented method of claim 8, wherein the refactoring further comprises:
   determining that there is a gap between the non-exposing method calls and the business capabilities or between the program-exposing method calls and the service domain interactions; and
   inserting, into the program, a coding template that addresses the gap.

14. The computer-implemented method of claim 8, wherein the aligning the first graph and the second graph comprise converting the first graph and the second graph into representations in a common embedding space.

15. A computer program product for facilitating monolith-to-microservice refactoring via source-code-to-domain-model graph comparison, the computer program product comprising a non-transitory computer-readable memory having program instructions embodied therewith, the program instructions executable by a processor to cause the processor to:
   train a neural network to refactor monolithic applications into microservices according to target domain models;
   access, using the neural network, source code of a monolithic application and a target domain model corresponding to the monolithic application; and
   generate, using the neural network, a group of microservices associated with the target domain model based on refactoring the monolithic application, by aligning a first graph representing the source code with a second graph representing the target domain model, wherein the aligning the first graph with the second graph yields a set of node pairs that respectively map nodes of the first graph to nodes of the second graph, wherein the nodes of the second graph respectively correspond to the group of microservices, wherein the set of node pairs indicate that a first node of the first graph is mapped to a second node of the second graph, wherein the first node represents a program within the source code, wherein the second node represents a service domain within the target domain model, and wherein the refactoring further comprises:
      comparing, via natural language processing, non-exposing method calls written within the program to business capabilities specified by the target domain model for the service domain, and
      comparing, via the natural language processing, program-exposing method calls written within the program to service domain interactions specified by the target domain model for the service domain.

16. The computer program product of claim 15, wherein the program instructions are further executable to cause the processor to train the neural network to:
   generate the first graph by parsing the source code in search of programs and the program-exposing method calls, wherein the nodes of the first graph respectively represent the programs, and wherein edges of the first graph respectively represent the program-exposing method calls; and
   generate the second graph by parsing the target domain model in search of service domains and the service domain interactions, wherein the nodes of the second graph respectively represent the service domains, and wherein edges of the second graph respectively represent the service domain interactions.

17. The computer program product of claim 16, wherein the service domains are described by a swagger portion of the target domain model, and wherein the service domain interactions are described by a transaction flow portion of the target domain model.

18. The computer program product of claim 15, wherein the aligning the first graph with the second graph is based on Euclidean distances that respectively separate embedded node-wise representations of the first graph from embedded node-wise representations of the second graph.

19. The computer program product of claim 15, wherein the program instructions are further executable to cause the processor to:
   access user-provided feedback, wherein the user-provided feedback accepts or rejects at least one of the set of node pairs.

20. The computer program product of claim 15, wherein the refactoring further comprises:
   determining that there is a gap between the non-exposing method calls and the business capabilities or between the program-exposing method calls and the service domain interactions; and
   inserting, into the program, a coding template that addresses the gap.

* * * * *